(12) United States Patent
Kim

(10) Patent No.: US 7,847,889 B2
(45) Date of Patent: Dec. 7, 2010

(54) PANEL FOR DISPLAY DEVICE WITH LIGHT BLOCKING ON BLUE COLOR FILTER AND LIQUID CRYSTAL DISPLAY

(75) Inventor: Dong-Gyu Kim, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 10/865,642

(22) Filed: Jun. 9, 2004

(65) Prior Publication Data
US 2004/0246410 A1 Dec. 9, 2004

(30) Foreign Application Priority Data
Jun. 9, 2003 (KR) ............. 10-2003-0036706

(51) Int. Cl.
G02F 1/1335 (2006.01)
G02F 1/1333 (2006.01)
G09G 3/36 (2006.01)

(52) U.S. Cl. ............ 349/106; 349/107; 349/108; 349/109; 349/110; 349/111; 345/88

(58) Field of Classification Search ......... 349/106–111; 345/88
See application file for complete search history.

(56) References Cited
U.S. PATENT DOCUMENTS

| | | | | |
|---|---|---|---|---|
| 5,455,075 A | * | 10/1995 | Longo | 427/398.1 |
| 5,626,796 A | * | 5/1997 | Tsujimura et al. | 252/582 |
| 5,844,255 A | * | 12/1998 | Suzuki et al. | 257/59 |
| 6,038,002 A | * | 3/2000 | Song | 349/43 |
| 6,057,900 A | * | 5/2000 | Ono et al. | 349/110 |
| 6,266,121 B1 | * | 7/2001 | Shigeta et al. | 349/156 |
| 6,340,963 B1 | * | 1/2002 | Anno et al. | 345/92 |
| 6,424,402 B1 | * | 7/2002 | Kishimoto | 349/156 |
| 6,468,822 B2 | * | 10/2002 | Maeda et al. | 438/30 |
| 6,583,846 B1 | * | 6/2003 | Yanagawa et al. | 349/155 |
| 6,749,975 B2 | * | 6/2004 | Cheng et al. | 430/7 |
| 6,879,359 B1 | * | 4/2005 | Kikkawa et al. | 349/113 |
| 6,911,668 B2 | * | 6/2005 | Youn et al. | 257/59 |
| 2002/0021378 A1 | * | 2/2002 | Murade | 349/43 |
| 2002/0036146 A1 | * | 3/2002 | Akutsu et al. | 205/316 |
| 2002/0089615 A1 | * | 7/2002 | Sakamoto et al. | 349/43 |

FOREIGN PATENT DOCUMENTS

| | | |
|---|---|---|
| JP | 07-281195 | 10/1995 |
| JP | 09-113866 A | 5/1997 |
| JP | 10-197877 | 7/1998 |
| JP | 2002-090748 | 3/2002 |
| KR | 0310164 B1 | 9/2001 |

* cited by examiner

*Primary Examiner*—Hoan C Nguyen
(74) *Attorney, Agent, or Firm*—Innovation Counsel LLP

(57) ABSTRACT

Panels for a display device, a liquid crystal display, and methods to manufacture the same are disclosed. A light blocking member on a first panel advantageously overlaps a transistor and an opaque element on a second panel for advantageously reducing or eliminating light leakage, thereby allowing for sharp viewing contrast.

12 Claims, 26 Drawing Sheets

PANEL FOR DISPLAY DEVICE WITH LIGHT BLOCKING ON BLUE COLOR FILTER AND LIQUID CRYSTAL DISPLAY

BACKGROUND (a) Field of the Invention

The present invention relates to a panel for a display device and a liquid crystal display including the panel.

(b) Description of the Related Art

Liquid crystal displays (LCDs) are one of the most widely used flat panel displays. An LCD includes two panels having field-generating electrodes and a gap interposed therebetween, a liquid crystal (LC) layer filled in the gap between the panels, and a plurality of spacers sustaining the gap.

The LCD displays images by applying voltages to the field-generating electrodes to generate an electric field in the LC layer, which determines orientations of LC molecules in the LC layer to adjust polarization of incident light.

Among LCDs including field-generating electrodes on respective panels, one kind of LCD provides a plurality of pixel electrodes arranged in a matrix at one panel and a common electrode covering an entire surface of the other panel. The image display of the LCD is accomplished by applying individual voltages to the respective pixel electrodes. For the application of the individual voltages, a plurality of three-terminal thin film transistors (TFTs) are connected to the respective pixel electrodes, and a plurality of gate lines for transmitting signals for controlling the TFTs and a plurality of data lines for transmitting voltages to be applied to the pixel electrodes are provided on the panel.

An LCD also includes a thick light blocking film for blocking light incident on the TFTs since the TFTs generally include amorphous silicon that generates light-induced leakage current. However, the light blocking film may cause light leakage near its edges.

In particular, the light leakage near the edges of the light blocking film is severe in a vertically aligned (VA) mode LCD having excellent contrast ratio. Since a VA LCD generally includes a liquid crystal layer having negative dielectric anisotropy, alignment vertical to the panels, and crossed polarizers, it may almost completely block light in the absence of an electric field and thus it realizes an excellent black state. However, edges of the thick light blocking film pretilts liquid crystal molecules to cause the light leakage in the black state, thereby increasing the luminance in the black state to drastically decrease the contrast ratio.

SUMMARY

Panels for a display device, a liquid crystal display, and methods to manufacture the same are disclosed so as to advantageously reduce or eliminate light leakage in the black state thereby increasing viewing contrast.

More specifically, in accordance with one embodiment of the present invention, a display device panel is disclosed, including an insulating substrate and a transistor formed on the insulating substrate. The panel further includes an opaque element formed on the insulating substrate and electrically separated from the transistor, wherein the transistor and a portion of the opaque element are spatially overlapped by a light blocking member disposed opposite the display device panel.

In accordance with another embodiment of the present invention, a display device panel is disclosed, including an insulating substrate, and a light blocking member on the insulating substrate, the light blocking member spatially overlapping a transistor and a portion of an opaque element, the transistor and the opaque element being disposed opposite the display device panel.

In accordance with yet another embodiment of the present invention, a liquid crystal display is disclosed, comprising a first panel including a first insulating substrate, a transistor formed on the first insulating substrate, and an opaque element formed on the first insulating substrate and electrically separated from the transistor. The display further comprises a second panel including a second insulating substrate, and a light blocking member on the second insulating substrate, the light blocking member spatially overlapping the transistor and a portion of the opaque element. The display further comprises and a liquid crystal layer between the first panel and the second panel.

In accordance with yet another embodiment of the present invention, a method of manufacturing a liquid crystal display is disclosed, comprising providing a first panel including a transistor and an opaque element formed on a first insulating substrate, providing a second panel including a light blocking member on a second insulating substrate, and providing a liquid crystal layer between the first panel and the second panel. The method further includes coupling the first panel, the liquid crystal layer, and the second panel such that the light blocking member spatially overlaps the transistor and a portion of the opaque element.

BRIEF DESCRIPTION OF THE DRAWINGS

The present invention will become more apparent by describing embodiments thereof in detail with reference to the accompanying drawings in which.

DETAILED DESCRIPTION

Figure 1:
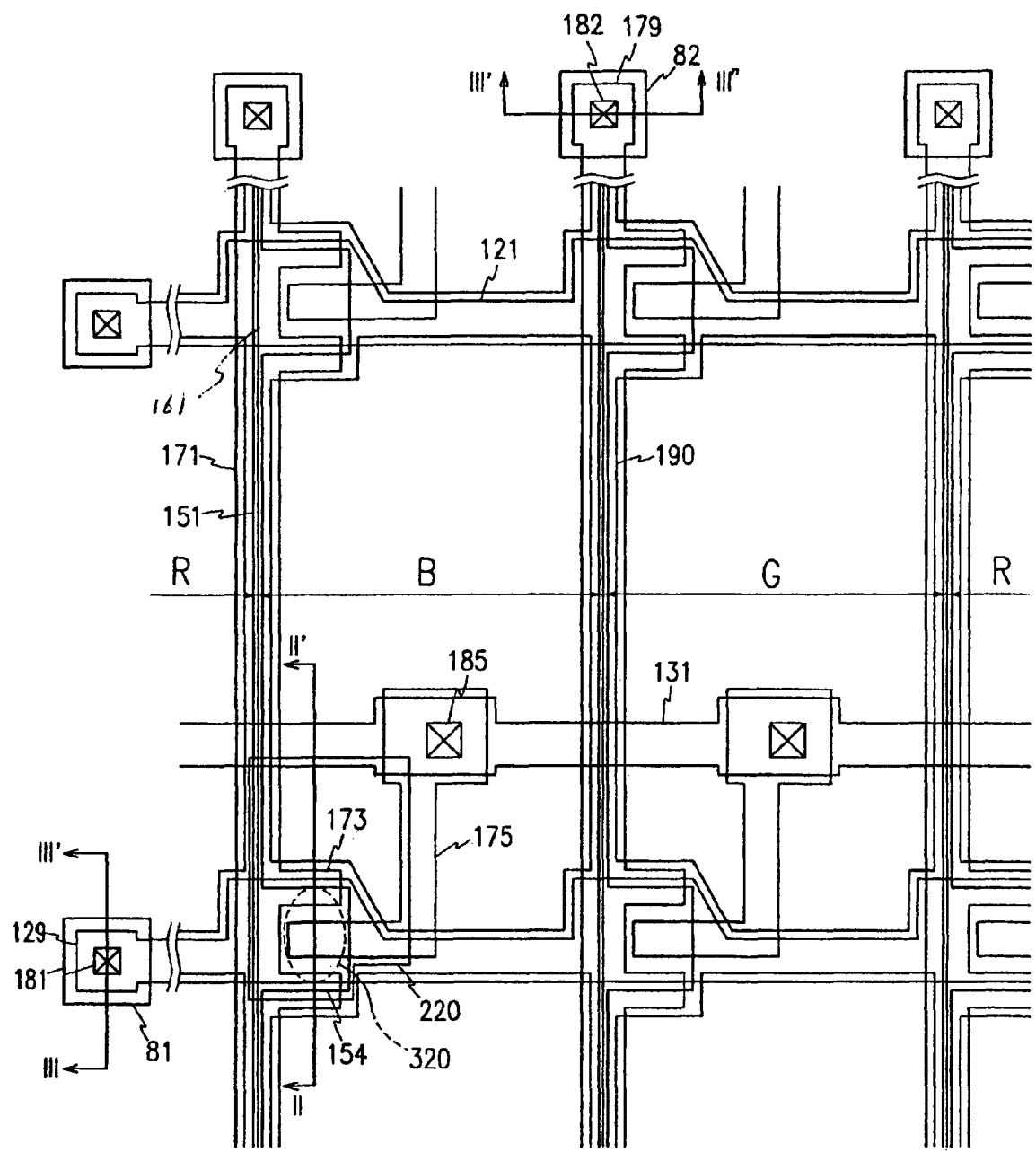
FIG. 1 is an exemplary layout view of an LCD according to an embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Liquid crystal displays, panels therefore, and manufacturing methods thereof according to embodiments of the present invention will now be described with reference to the accompanying drawings.

An LCD will be described in detail with reference to FIGS. 1-3.

Figure 2:
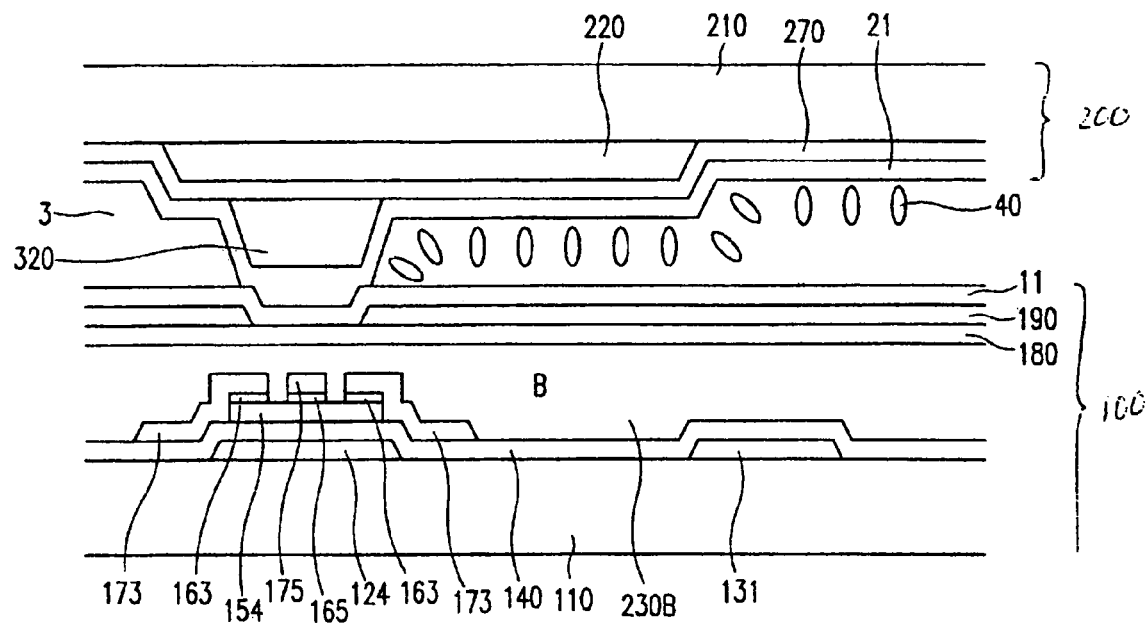
FIG. 2 is a sectional view of the LCD shown in FIG. 1 taken along the line II-II'.
Figure 3:
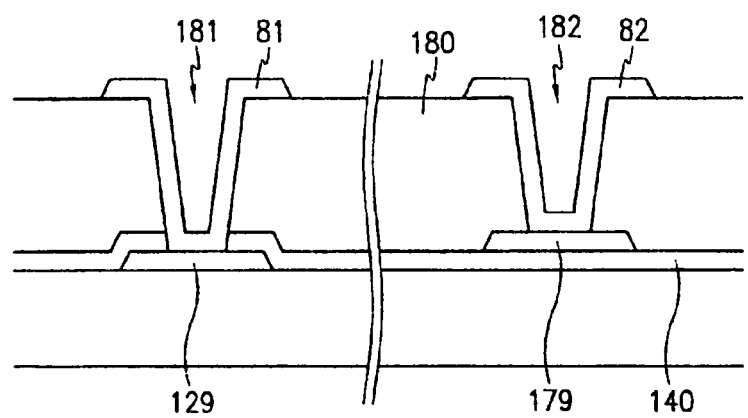
FIG. 3 is a sectional view of the LCD shown in FIG. 1 taken along the lines III-III' and III-III'.

FIG. 1 is an exemplary layout view of an LCD according to an embodiment of the present invention, FIG. 2 is a sectional view of the LCD shown in FIG. 1 taken along the line II-II', and FIG. 3 is a sectional view of the LCD shown in FIG. 1 taken along the line III-III'.

An LCD, according to an embodiment of the present invention, includes a lower panel 100, an upper panel 200, and a LC layer 3 interposed between the panels 100 and 200. The LCD also includes a plurality of LC molecules 40 that are aligned substantially vertical to surfaces of the panels 100 and 200 or that are aligned substantially parallel to surfaces of the panels 100 and 200 and twisted from the lower panel 100 to the upper panel 200.

The lower panel 100 is now described in detail.

A plurality of gate lines 121 for transmitting gate signals and a plurality of storage electrode lines 131 electrically separated from the gate lines 121 are formed on an insulating substrate 110.

The gate lines 121 extend substantially in a transverse direction and are separated from each other. Each gate line 121 includes a plurality of projections forming a plurality of gate electrodes 124 and an expanded end portion 129 having a large area for contact with another layer or an external device.

Each storage electrode line 131 extends substantially in the transverse direction and includes a plurality of expansions having large areas, and is located closer to one of two neighboring gate lines 121. The storage electrode lines 131 are supplied with a predetermined voltage such as a common voltage, which is applied to a common electrode 270 on the common electrode panel 200 of the LCD.

The gate lines 121 and the storage electrode lines 131 are preferably made of Al and Al alloy, Ag containing metal such as Ag and Ag alloy, Cu containing metal such as Cu and Cu alloy, Cr, Mo, Mo alloy, Ta, or Ti. They may have a multilayered structure. The gate lines 121 and the storage electrode lines 131 may include two films having different physical characteristics, a lower film and an upper film. The upper film is preferably made of low resistivity metal including Al containing metal such as Al and Al alloy for reducing signal delay or voltage drop in the gate lines 121 and the storage electrode lines 131. On the other hand, the lower film is preferably made of material such as Cr, Mo, Mo alloy, Ta, or Ti, which has good physical, chemical, and electrical contact characteristics with other materials such as indium tin oxide (ITO) and indium zinc oxide (IZO). A good exemplary combination of the lower film material and the upper film material is Cr and Al—Nd alloy, respectively.

In addition, the lateral sides of the gate lines 121 and the storage electrode lines 131 are inclined relative to a surface of the substrate 110, and the inclination angle thereof ranges between about 20-80 degrees.

A gate insulating layer 140 preferably made of silicon nitride (SiNx) is formed on the gate lines 121 and the storage electrode lines 131.

A plurality of semiconductor stripes 151 preferably made of hydrogenated amorphous silicon (abbreviated "a-Si") are formed on the gate insulating layer 140. Each semiconductor stripe 151 extends substantially in the longitudinal direction and has a plurality of projections 154 branched out toward the gate electrodes 124.

A plurality of ohmic contact stripes and islands 161 and 165 preferably made of silicide or n+ hydrogenated a-Si heavily doped with n type impurity are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to a surface of the substrate 110, and the inclination angles thereof are preferably in a range between about 30-80 degrees.

A plurality of data lines 171 and a plurality of drain electrodes 175 are formed on the ohmic contacts 161 and 165 and the gate insulating layer 140.

The data lines 171 for transmitting data voltages extend substantially in the longitudinal direction and intersect the gate lines 121 and the storage electrode lines 131. Each data line 171 includes an expansion 179 having a larger area for contact with another layer or an external device.

A plurality of branches of each data line 171, which project toward the drain electrodes 175, form a plurality of source electrodes 173 partly enclosing one end of the drain electrodes 175. Each drain electrode 175 extends to an expansion of the storage electrode lines 131 and has an expansion overlapping the expansion of the storage electrode lines 131. Each pair of the source electrodes 173 and the drain electrodes 175 are separated from each other and opposite each other with respect to a gate electrode 124. A gate electrode 124, a source electrode 173, and a drain electrode 175 along with a projection 154 of a semiconductor stripe 151 form a TFT having a channel formed in the projection 154 disposed between the source electrode 173 and the drain electrode 175.

The data lines 171 and the drain electrodes 175 are preferably made of refractory metal such as Cr, Mo, Mo alloy, Ta, or Ti. They may include a lower film preferably made of Mo, Mo alloy, or Cr, and an upper film located thereon and preferably made of Al containing metal or Ag containing metal.

Like the gate lines 121 and the storage electrode lines 131, the data lines 171 and the drain electrodes 175 have tapered lateral sides relative to a surface of the substrate 110, and the inclination angles thereof range between about 30-80 degrees.

The ohmic contacts 161 and 165 are interposed only between the underlying semiconductor stripes 151 and the overlying data lines 171 and the overlying drain electrodes 175 thereon and reduce the contact resistance therebetween. The semiconductor stripes 151 include a plurality of exposed portions, which are not covered with the data lines 171 and the drain electrodes 175, such as portions located between the source electrodes 173 and the drain electrodes 175.

A plurality of red, green, and blue color filter stripes R, G, and B, respectively, is formed on the data lines 171, the drain electrodes 175, and the exposed portions of the semiconductor stripes 151. Each of the color filter stripes R, G, and B is disposed substantially between two adjacent data lines 171 and extends in a longitudinal direction. The color filter stripes R, G, and B are not disposed on a peripheral area which is provided with the expansions 129 and 179 of the gate lines 121 and the data lines 171. Although the figures show that edges of adjacent color filter stripes R, G, and B exactly match each other, the color filter stripes R, G, and B may overlap each other on the data lines 171 to enhance the light blocking or they may be spaced apart from each other.

An interlayer insulating layer (not shown) preferably made of inorganic insulating material such as silicon oxide or silicon nitride may be disposed under the color filter stripes R, G, and B.

A passivation layer 180 is formed on the color filter stripes R, G, and B. The passivation layer 180 is preferably made of acrylic organic insulating material having a good flatness characteristic and low dielectric constant. In one example, passivation layer 80 may be made of a low dielectric insulating material such as a-Si:C:O or a-Si:O:F having a dielectric constant lower than 4.0 and may be formed by chemical vapor deposition (CVD).

The passivation layer 180 has a plurality of contact holes 182 exposing the expansions 179 of the data lines 171, and the passivation layer 180 and the color filter stripes R, G, and B have a plurality of contact holes 185 exposing the drain electrodes 175. Furthermore, the passivation layer 180 and the gate insulating layer 140 have a plurality of contact holes 181 exposing the expansions 129 of the gate lines 121. Portions of the sidewalls of the contact holes 185 formed by the color filter stripes R, G, and B may be narrower than those formed by the passivation layer 180 such that the sidewalls have stepped profiles to smooth the profile of an overlying layer. Otherwise, the contact holes 185 may be formed only by the passivation layer 180, and the color filter stripes R, G, and B may have a plurality of openings (not shown) exposing the drain electrodes 175 and surrounding the contact holes 185. The above-described interlayer insulating layer may have substantially the same planar shape as the passivation layer 180.

The passivation layer 180 may be omitted if unnecessary.

A plurality of pixel electrodes 190 and a plurality of contact assistants 81 and 82, which are preferably made of ITO or IZO, are formed on the passivation layer 180.

The pixel electrodes 190 are physically and electrically connected to the drain electrodes 175 through the contact holes 185 such that the pixel electrodes 190 receive the data voltages from the drain electrodes 175.

The pixel electrodes 190 supplied with the data voltages generate electric fields in cooperation with the common electrode 270 on the upper panel 200, which reorient the liquid crystal molecules 40 in the liquid crystal layer 3.

A pixel electrode 190 and the common electrode 270 form a liquid crystal capacitor, which stores applied voltages after turning off the TFT. An additional capacitor called a "storage capacitor," which is connected in parallel to the liquid crystal capacitor, is provided for enhancing the voltage storing capacity. The storage capacitors are implemented by overlapping the pixel electrodes 190 with the storage electrode lines 131. The capacitances of the storage capacitors, i.e., the storage capacitances, are increased by extending and overlapping the drain electrodes 175, which are connected to and located under the pixel electrodes 190, to/with the storage electrode lines 131 for decreasing the distance between the terminals and by providing the expansions at the drain electrodes 175 and the storage electrode lines 131 for increasing overlapping areas.

The pixel electrodes 190 may optionally overlap the gate lines 121 and the data lines 171 to increase aperture ratio.

The contact assistants 81 and 82 are connected to the exposed expansions 129 of the gate lines 121 and the exposed expansions 179 of the data lines 171 through the contact holes 181 and 182, respectively. The contact assistants 81 and 82 are not requisites but preferred to protect the exposed portions 129 and 179 and to complement the adhesiveness of the exposed portions 129 and 179 and external devices.

According to another embodiment of the present invention, the pixel electrodes 190 are made of transparent conductive polymer. For a reflective LCD, the pixel electrodes 190 are made of opaque reflective metal. In these cases, the contact assistants 81 and 82 may be made of material such as ITO or IZO different from the pixel electrodes 190.

Finally, an alignment layer 11 preferably made of thin organic material such as polyimide is formed on the pixel electrodes 190 and the passivation layer 180. The alignment layer 11 enforces predetermined orientations of the liquid crystal molecules 40.

The description of the upper panel 200 follows.

A plurality of light blocking members 220 are formed on an insulating substrate 210 such as transparent glass. The light blocking members 220 are preferably made of organic material containing black pigment and have a thickness of about 1.5-3.0 microns. The light blocking members 220 face the TFTs disposed on the blue color filter stripes B such that they block ultraviolet and blue light that may induce photo-electrons in the channels of the TFTs to cause current leakage. In addition, edges of the light blocking members 220 overlap opaque elements such as the storage electrode lines 131, the gate lines 121, and the data lines 171 such that the opaque elements block the light leakage due to the height difference at the edges of the light blocking members 220. In the meantime, since the red and the green color filter stripes R and G block the ultraviolet and the blue light, the light blocking member 220 may not be required for the TFTs thereunder. The light blocking members 220 may have portions facing the gate lines 121 and the data lines 171 and may have open areas facing the pixel electrodes 190.

A common electrode 270 preferably made of transparent conductive material such as ITO and IZO is formed on the light blocking members 220 and the substrate 210. The common electrode 270 is supplied with the common voltage as described above.

A plurality of columnar spacers 320 are formed on the common electrode 270 and disposed opposite the light blocking members 220.

Finally, an alignment layer 21 preferably made of thin organic material such as polyimide is formed on the spacers 320 and the common electrode 270.

A plurality of protrusions (not shown) for determining tilt directions of the liquid crystal molecules 40 under the electric field generated by the pixel electrodes 190 and the common electrode 270 may be provided on the common electrode 270. The protrusions may be made of the same layer as the spacers 320. In this case, the liquid crystal layer 3 preferably has negative dielectric anisotropy and is in a vertical alignment mode by its own characteristic or the enforcement of the alignment layers 11 and 21.

A method of manufacturing the upper panel 200 of the LCD shown in FIGS. 1-3 according to an embodiment of the present invention will be now described in detail with reference to FIGS. 4A-4C as well as FIGS. 1-3.

Figure 4A:
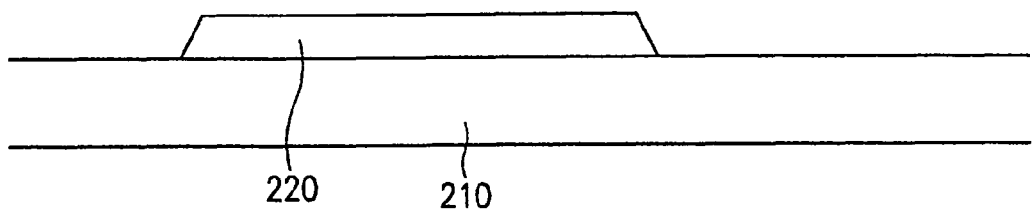
FIGS. 4A-4C are sectional views illustrating a manufacturing method of the upper panel in the LCD shown in FIGS. 1-3 according to an embodiment of the present invention.
Figure 4B:
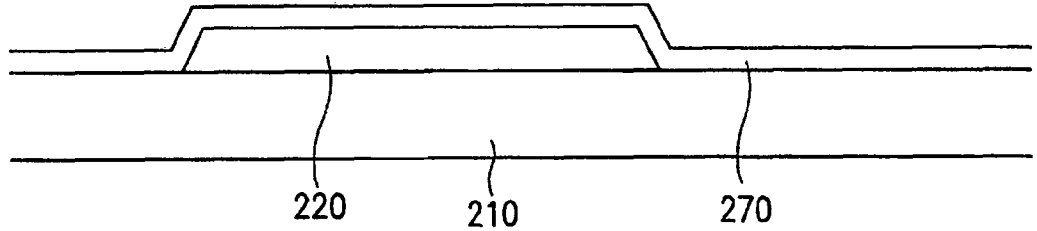
Figure 4C:
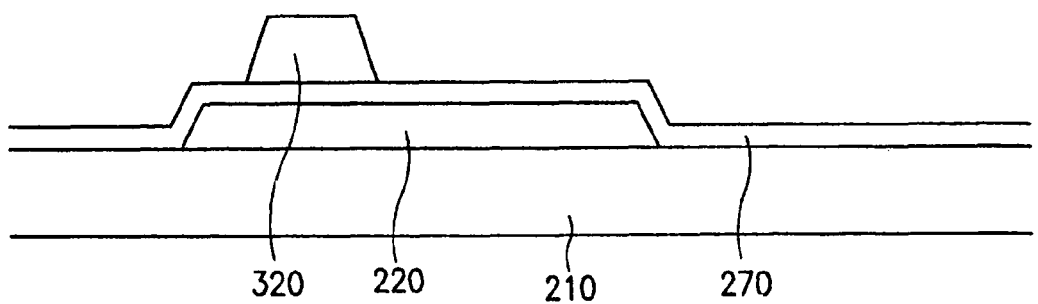

FIGS. 4A-4C are sectional views illustrating a manufacturing method of the upper panel 200 in the LCD shown in FIGS. 1-3 according to an embodiment of the present invention.

Referring to FIG. 4A, a photosensitive organic film containing black pigment and having a thickness of about 1.5-3.0 microns is coated on an insulating substrate 210 and patterned by photolithography to form a plurality of light blocking members 220.

Referring to FIG. 4B, an ITO or IZO film is deposited to form a common electrode 270.

Referring to FIG. 4C, an acrylic photosensitive organic film is coated and patterned by photolithography to form a plurality of columnar spacers 320 disposed on the light blocking members 220. Thicknesses of the spacers 320 and the light blocking members 220 are preferably about 2.5 microns and about 1.5 microns, respectively, when a cell, gap between the lower panel 100 and the upper panel 200 is about 4.0 microns.

Referring to FIGS. 1-3, an alignment layer 21 is coated on the substrate 210.

A method of manufacturing the lower panel 100 (TFT array panel) shown in FIGS. 1-3 according to an embodiment of the present invention will be now described in detail with reference to FIGS. 5A to 8B as well as FIGS. 1-3.

FIGS. 5A, 6A, 7A and 8A are layout views of the TFT array panel shown in FIGS. 1-3 in intermediate steps of a manufacturing method thereof according to an embodiment of the present invention, and FIGS. 5B, 6B, 7B and 8B are sectional views of the TFT array panel shown in FIGS. 5A, 6A, 7A and 8A taken along the lines Vb-Vb', VIb-VIb', VIIb-VIIb', and VIIIb-VIIIb', respectively.

Figure 5A:
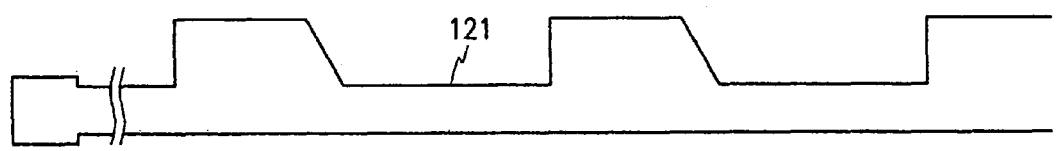
FIGS. 5A, 6A, 7A and 8A are layout views of the TFT array panel shown in FIGS. 1-3 in intermediate steps of a manufacturing method thereof according to an embodiment of the present invention.
Figure 5A:
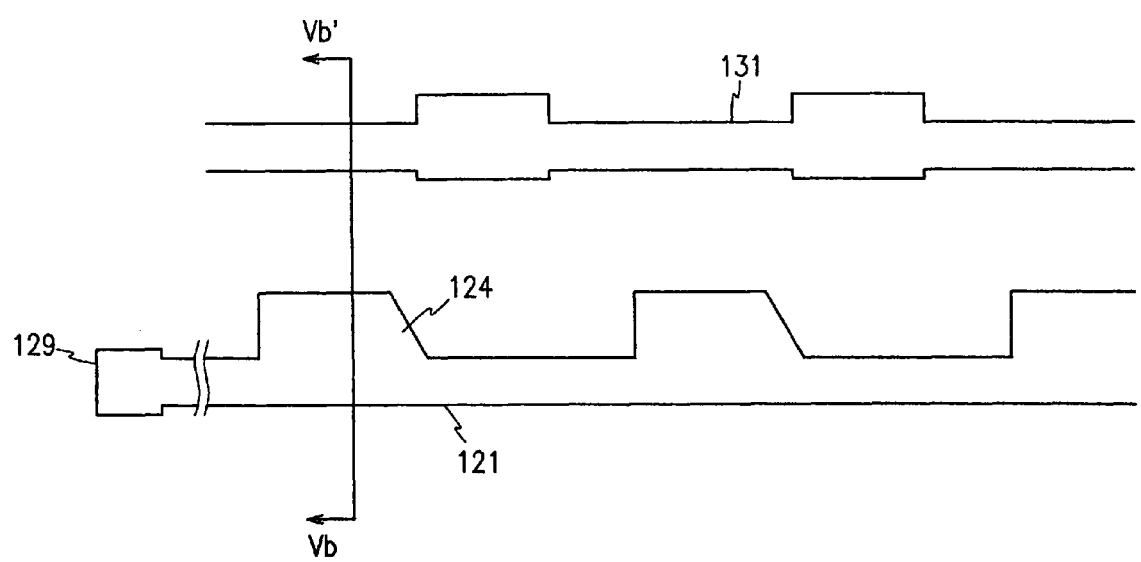
Figure 5B:
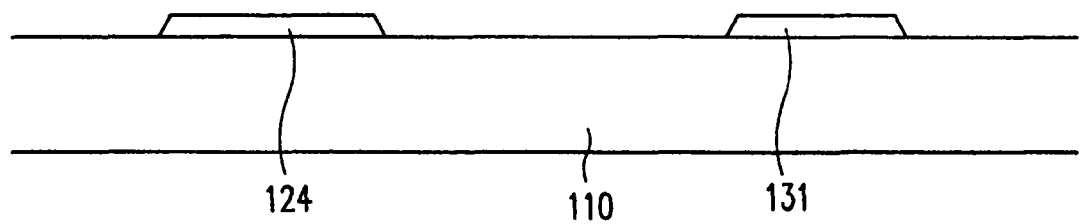
FIGS. 5B, 6B, 7B and 8B are sectional views of the TFT array panel shown in FIGS. 5A, 6A, 7A and 8A taken along the lines Vb-Vb', VIb-VIb', VIIb-VIIb', and VIIIb-VIIIb', respectively.

Referring to FIGS. 5A and 5B, a conductive film preferably made of metal and having a thickness of about 1,000 Å-3,000 Å is sputtered on an insulating substrate 110 and photolithographically etched to form a plurality of gate lines 121 including a plurality of gate electrodes 124 and the storage electrode lines 131.

Figure 6A:
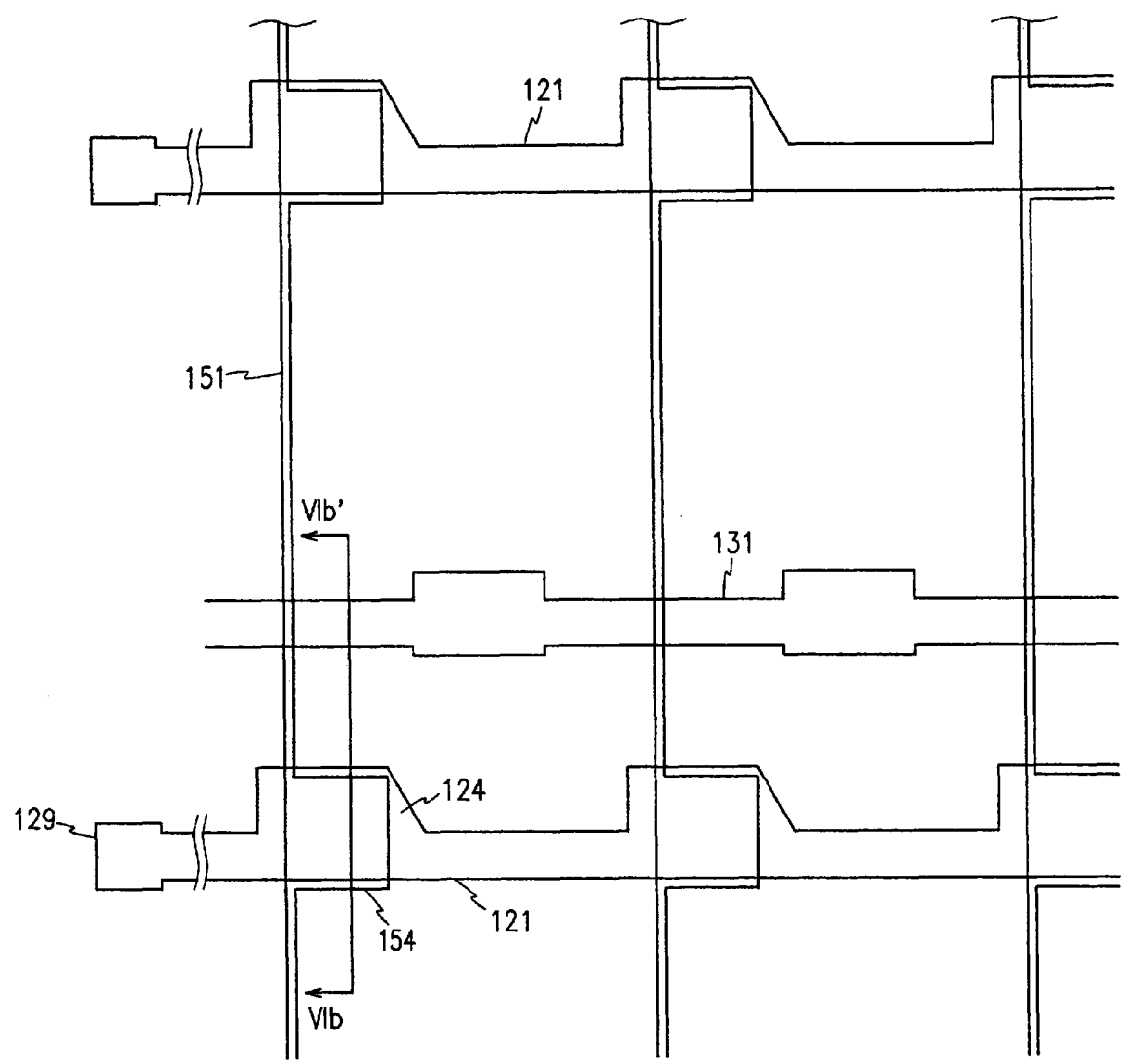
Figure 6B:
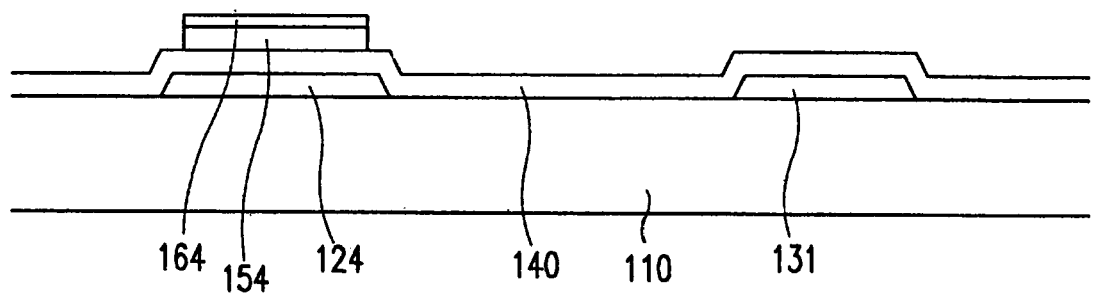

Referring to FIGS. 6A and 6B, after sequential deposition of a gate insulating layer 140, an intrinsic a-Si layer, and an extrinsic a-Si layer, the extrinsic a-Si layer and the intrinsic a-Si layer are photolithographically etched to form a plurality of extrinsic semiconductor stripes 164 and a plurality of intrinsic semiconductor stripes 151 including a plurality of projections 154 on the gate insulating layer 140.

Figure 7A:
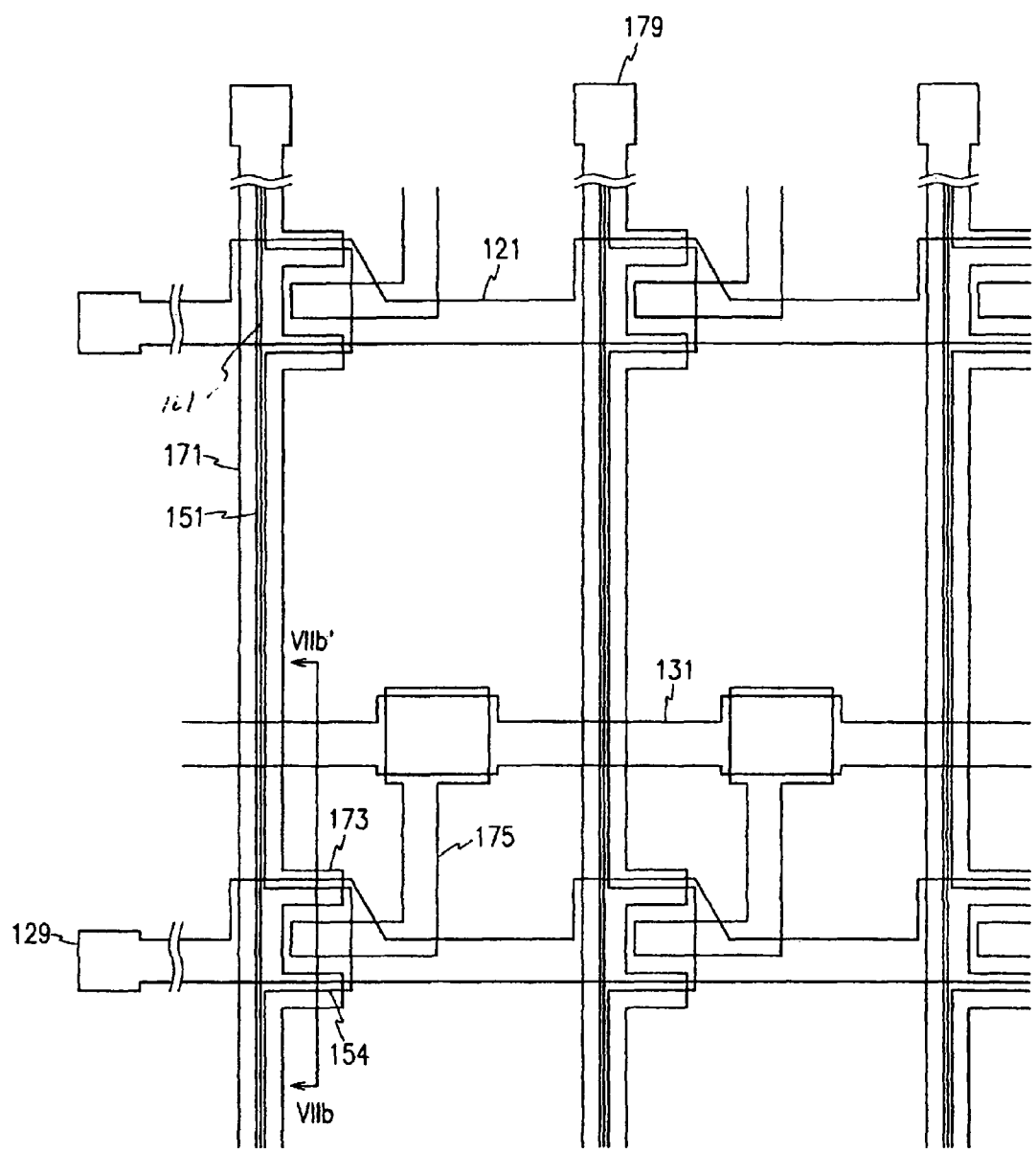
Figure 7B:
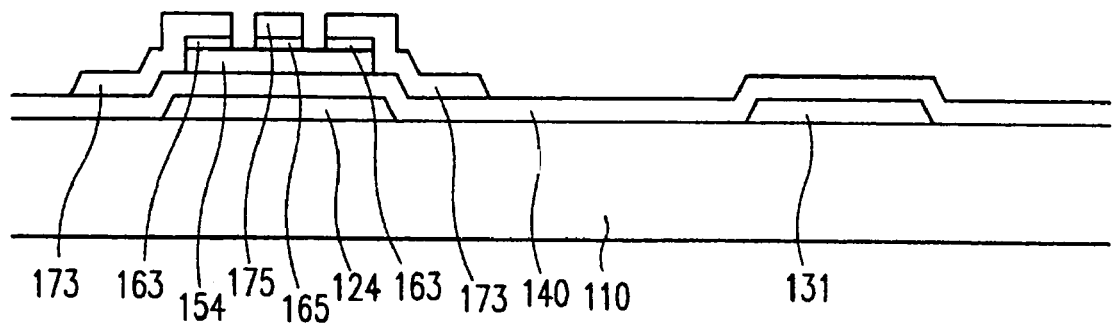

Referring to FIGS. 7A and 7B, a plurality of data lines 171 including a plurality of source electrodes 173 and a plurality of drain electrodes 175 are formed by photolithographic etching.

Thereafter, portions of the extrinsic semiconductor stripes 164 (FIG. 6B), which are not covered with the data lines 171 and the drain electrodes 175 are removed to complete a plurality of ohmic contact stripes 161 including a plurality of projections 163 and a plurality of ohmic contact islands 165 and to expose portions of the intrinsic semiconductor stripes 151. Oxygen plasma treatment preferably follows thereafter in order to stabilize the exposed surfaces of the semiconductor stripes 151.

Figure 8A:
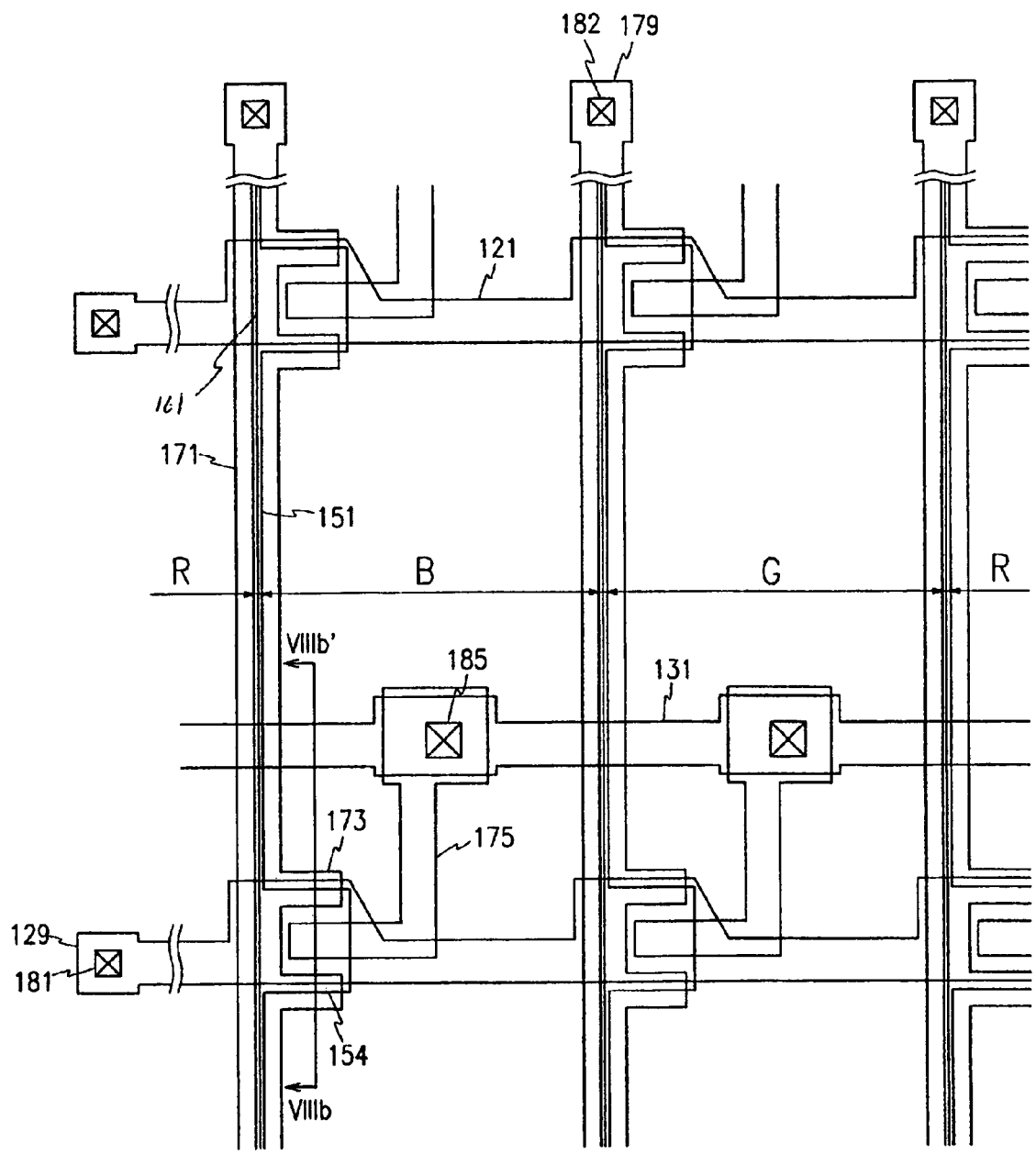
Figure 8B:
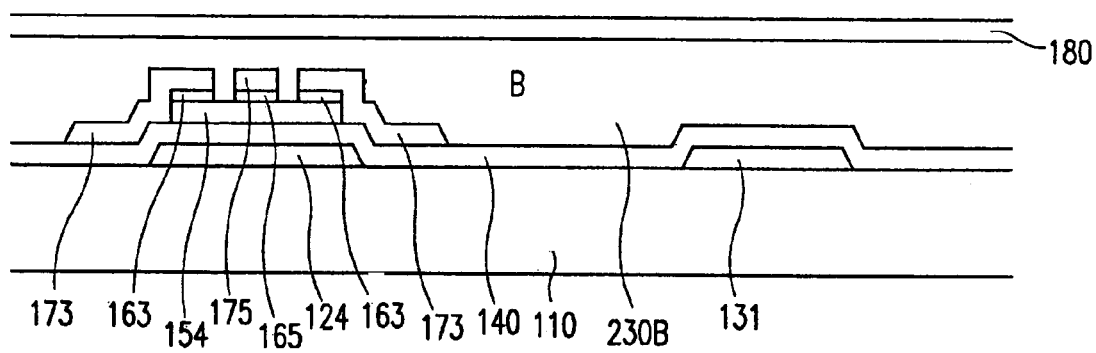

As shown in FIGS. 8A and 8B, an interlayer insulating layer (not shown) preferably made of silicon nitride is formed and photosensitive films including red, green, and blue pigments are coated and patterned in sequence to form a plurality of red, green, and blue color filter stripes R, G, and B. A passivation layer 180 is deposited and patterned along with the color filter stripes R, G, and B, the interlayer insulating layer, and the gate insulating layer 140 to form a plurality of contact holes 181, 182 and 185.

Finally, as shown in FIGS. 1-3, a plurality of pixel electrodes 190 and a plurality of contact assistants 81 and 82 are formed on the passivation layer 180 by depositing and photolithographically etching an ITO or IZO layer having a thickness of about 1,400 Å-1,600 Å. An alignment layer 11 is then coated on pixel electrodes 190.

An LCD according to another embodiment of the present invention will be described in detail with reference to FIGS. 9-11.

Figure 9:
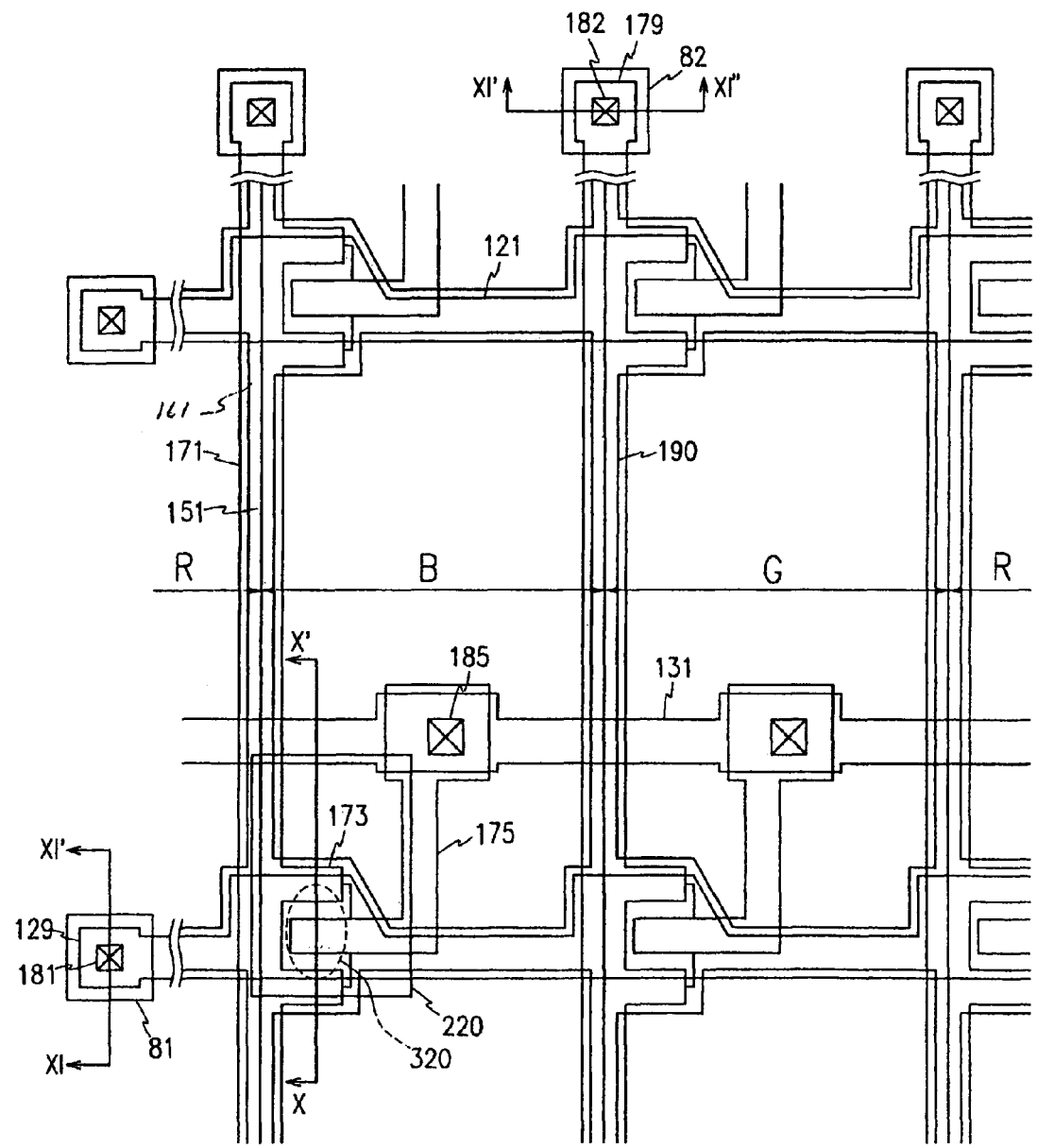
FIG. 9 is a layout view of an LCD according to another embodiment of the present invention.
Figure 10:
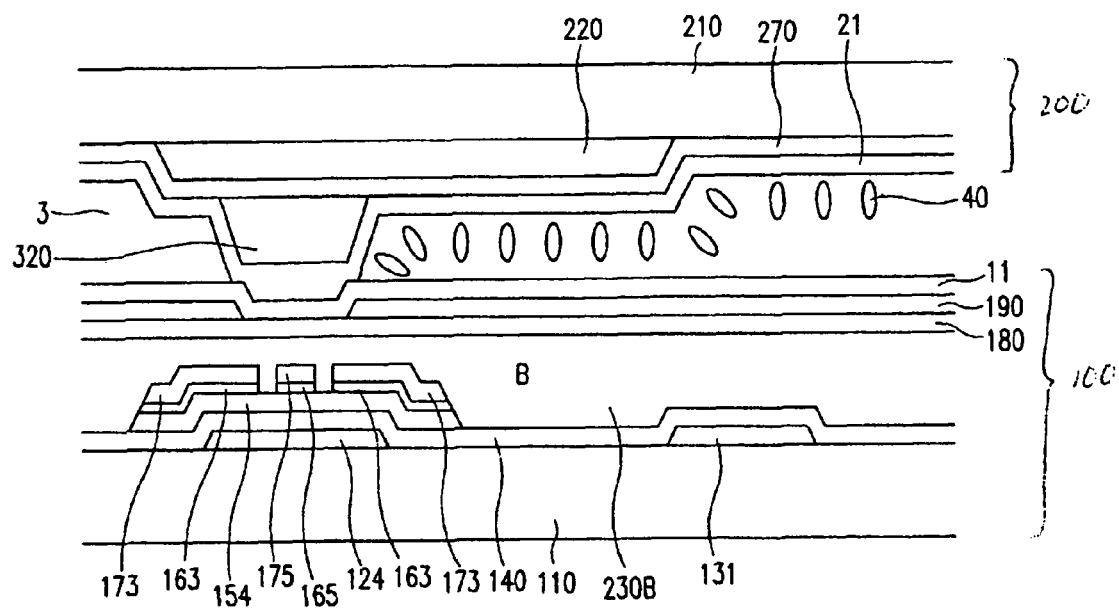
FIG. 10 is a sectional view of the LCD shown in FIG. 9 taken along the line X-X'.
Figure 11:
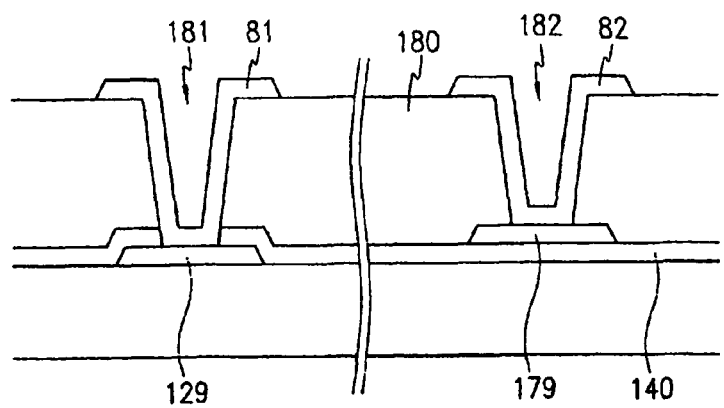
FIG. 11 is a sectional view of the LCD shown in FIG. 9 taken along the lines XI-XI' and XI'-XI"

FIG. 9 is a layout view of an LCD according to another embodiment of the present invention, FIG. 10 is a sectional view of the LCD shown in FIG. 9 taken along the line X-X', and FIG. 11 is a sectional view of the LCD shown in FIG. 9 taken along the lines XI-XI' and XI'-XI".

Referring to FIGS. 9-11, an LCD according to this embodiment also includes a lower panel 100, an upper panel 200, and a LC layer 3 interposed therebetween and including a plurality of liquid crystal molecules 40.

Layered structures of the panels 100 and 200 according to this embodiment are almost the same as those shown in FIGS. 1-3.

Regarding the lower panel 100, a plurality of gate lines 121 including a plurality of gate electrodes 124 and the storage electrode lines 131 are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and a plurality of drain electrodes 175 are formed on the ohmic contacts 161 and 165 and the gate insulating layer 140, and a plurality of red, green, and blue color filter stripes R, G, and B and a passivation layer 180 is formed thereon. A plurality of contact holes 181, 182, and 185 are provided at the passivation layer 180, the color filter stripes R, G, and B, and the gate insulating layer 140, and a plurality of pixel electrodes 190 and a plurality of contact assistants 81 and 82 are formed on the passivation layer 180.

Regarding the upper panel 200, a plurality of light blocking members 220, a common electrode 270, and a plurality of columnar spacers 320 are formed on an insulating substrate 210.

Different from the LCD shown in FIGS. 1-3, the semiconductor stripes 151 have almost the same planar shapes as the data lines 171 and the drain electrodes 175 as well as the underlying ohmic contacts 161 and 165, except for the projections 154 where TFTs are provided. That is, the semiconductor stripes 151 include some exposed portions, which are not covered with the data lines 171 and the drain electrodes 175, such as portions located between the source electrodes 173 and the drain electrodes 175.

Many of the above-described features of the LCD shown in FIGS. 1-3 may be appropriate to the LCD shown in FIGS. 9-11.

Now, a method of manufacturing the TFT array panel in the LCD shown in FIGS. 9-11 according to an embodiment of the present invention will be described in detail with reference to FIGS. 12A-17B as well as FIGS. 9-11.

Figure 12A:
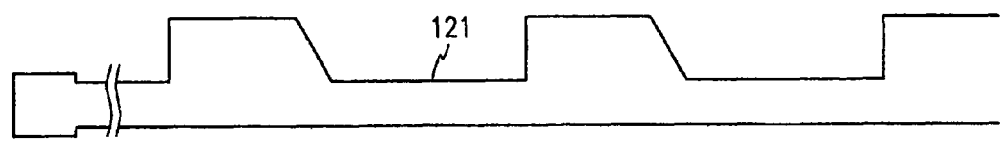
FIG. 12A is a layout view of a TFT array panel shown in FIGS. 9-11 in a first step of a manufacturing method thereof according to an embodiment of the present invention.
Figure 12A:
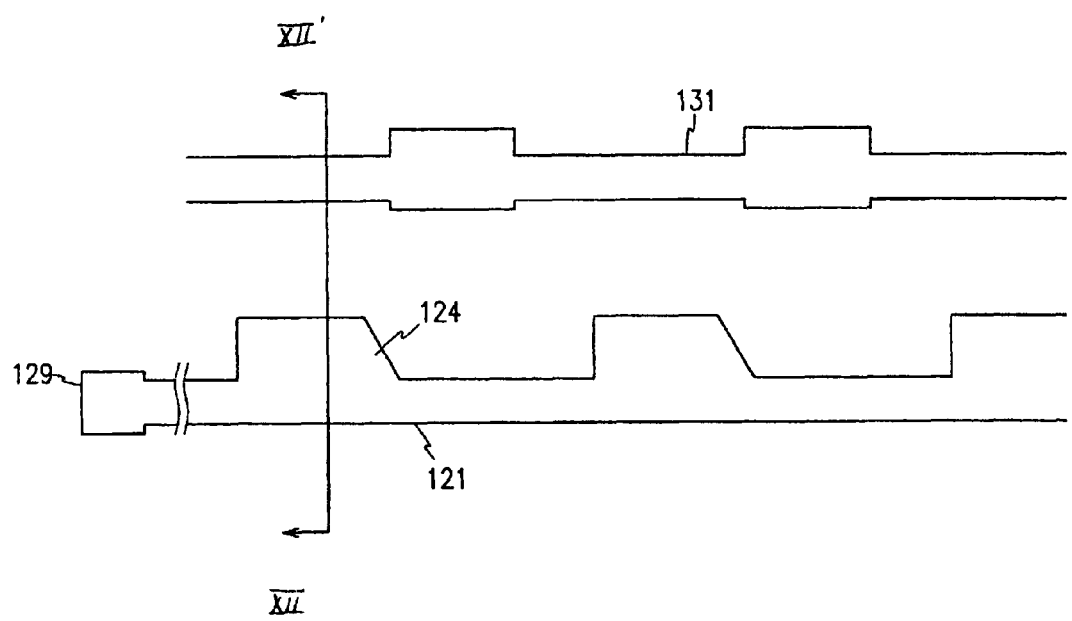
Figure 12B:
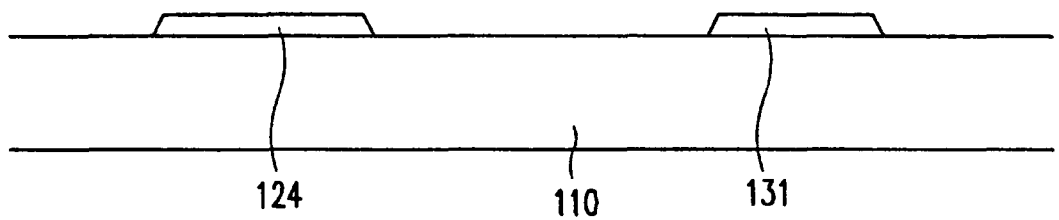
FIG. 12B is a sectional view of the TFT array panel shown in FIG. 12A taken along the line XIIB-XIIB'.
Figure 13:
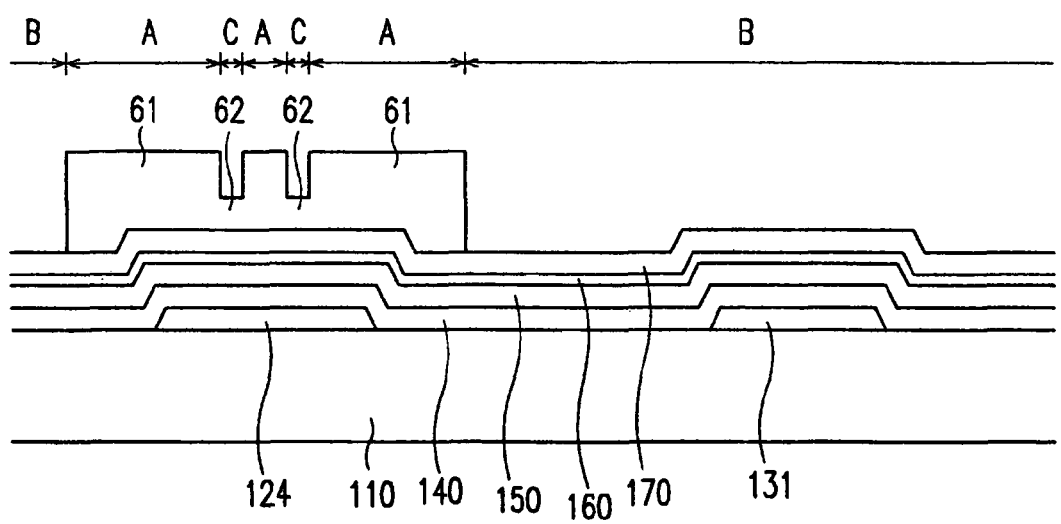
FIGS. 13-15 are sectional views of the TFT array panel shown in FIG. 12A taken along the line XIIB-XIIB', and illustrate the sequential steps following the step shown in FIG. 12B.
Figure 14:
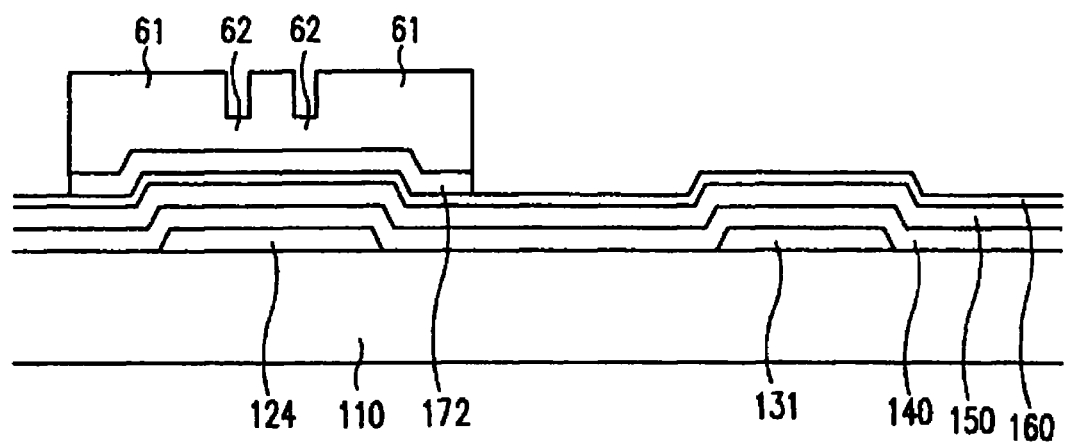
Figure 15:
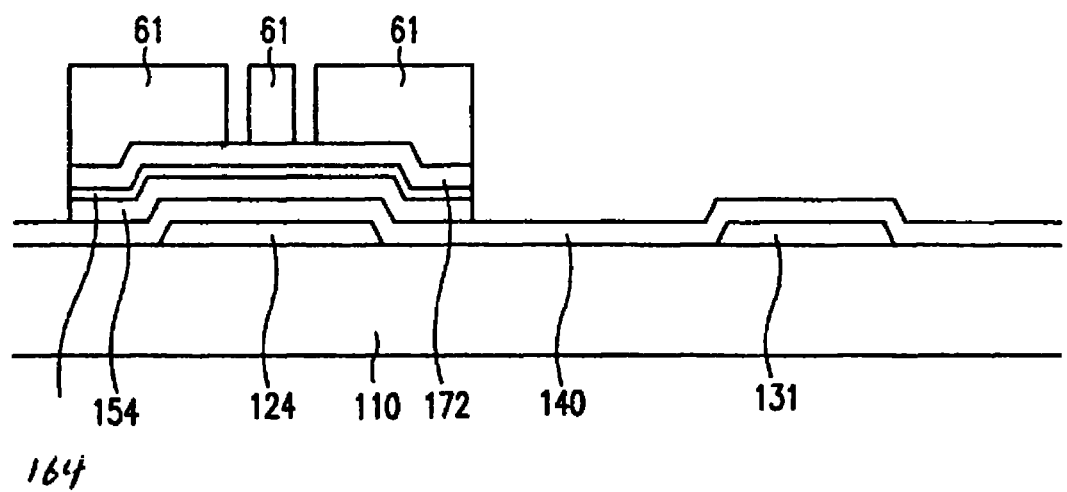
Figure 16A:
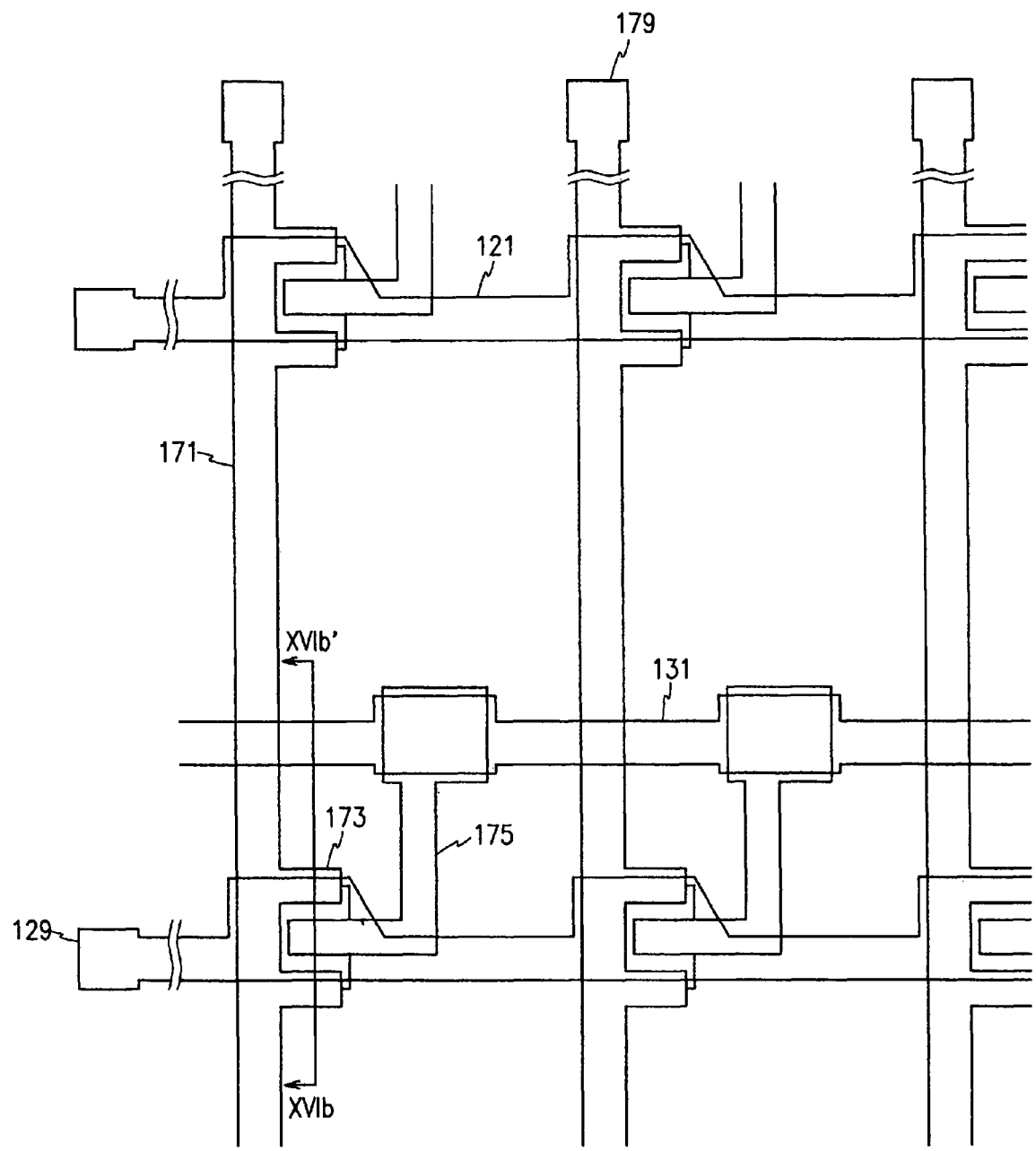
FIG. 16A is a layout view of the TFT array panel in the step following the step shown in FIG. 15.
Figure 16B:
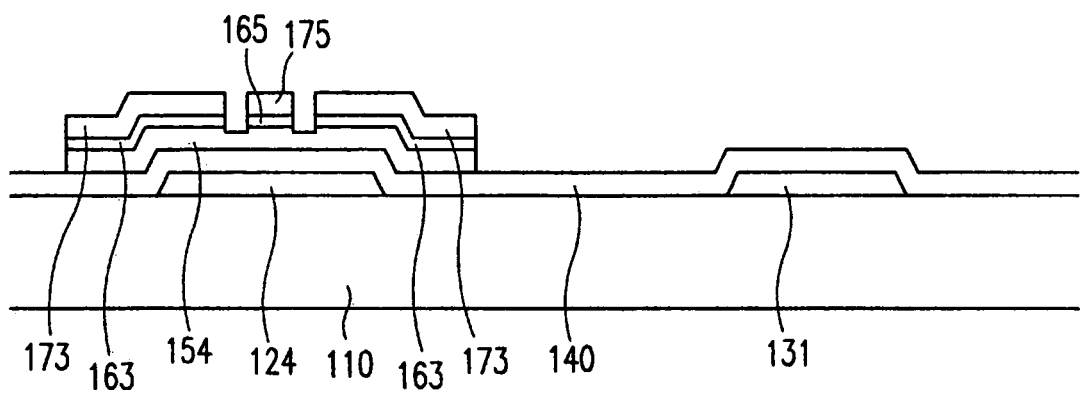
FIG. 16B is a sectional view of the TFT array panel shown in FIG. 16A taken along the line XVIb-XVIb'.
Figure 17A:
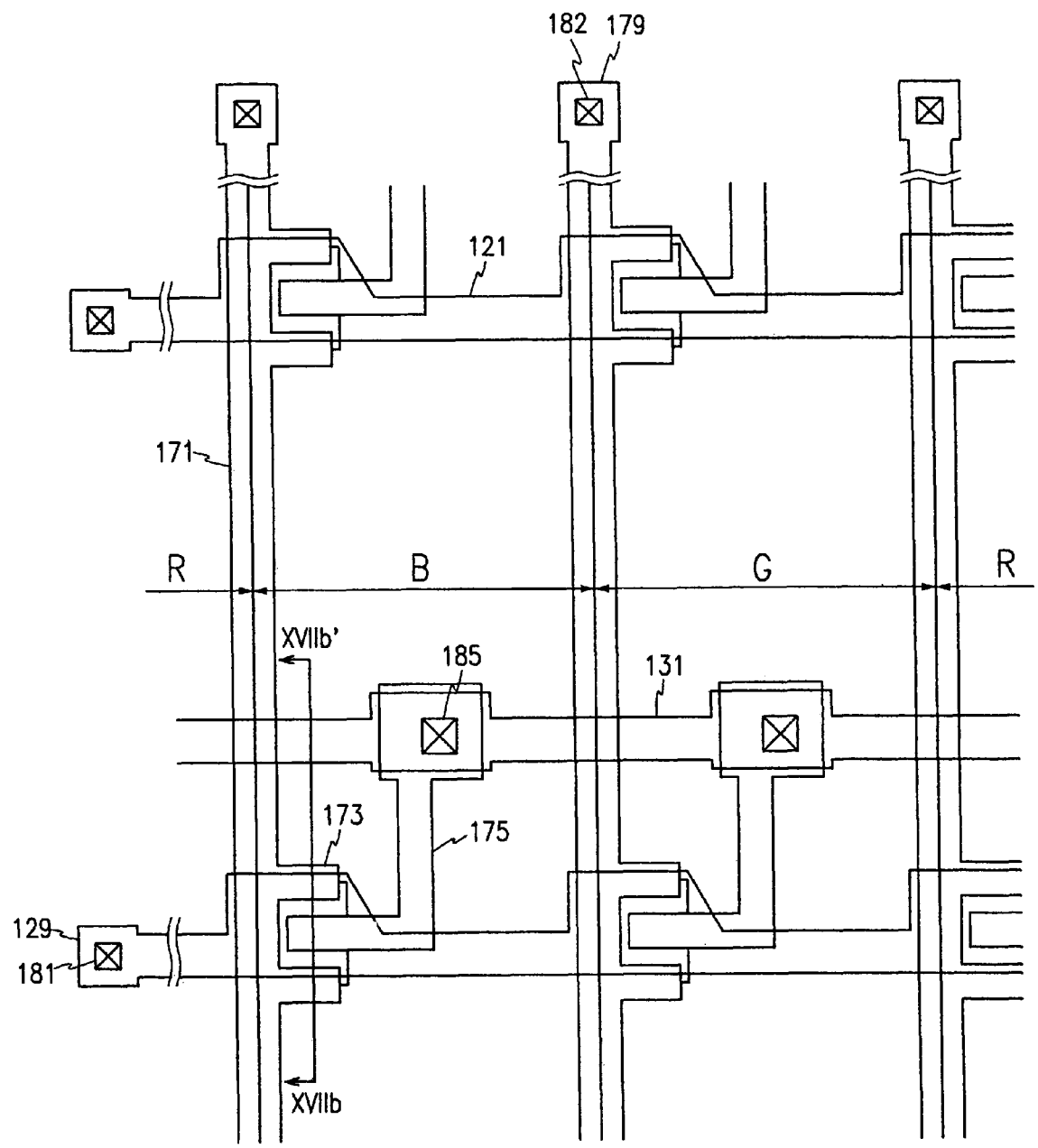
FIG. 17A is a layout view of a TFT array panel in the step following the step shown in FIGS. 16A and 16B.
Figure 17B:
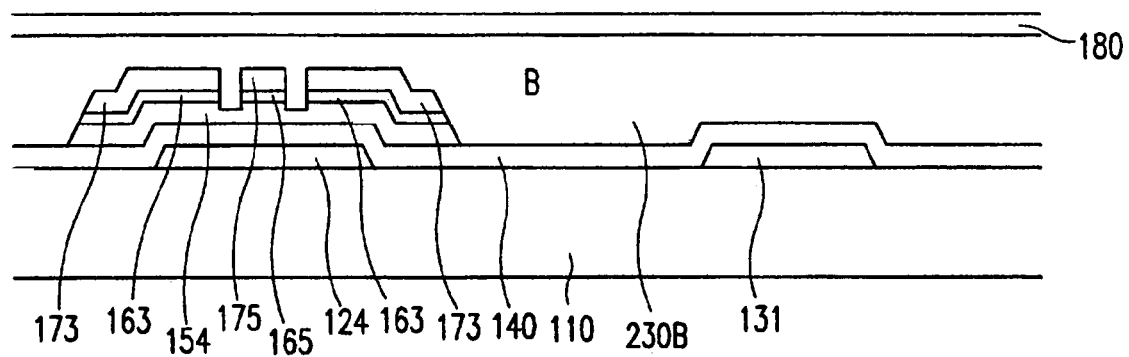
FIG. 17B is a sectional view of the TFT array panel shown in FIG. 17A taken along the line XVIIb-XVIIb'.

FIG. 12A is a layout view of a TFT array panel shown in FIGS. 9-11 in a first step of a manufacturing method thereof according to an embodiment of the present invention; FIG. 12B is a sectional view of the TFT array panel shown in FIG. 12A taken along the line XIIb-XIIb'; FIGS. 13-15 are sectional views of the TFT array panel shown in FIG. 12A taken along the line XIIb-XIIb', and illustrate the sequential steps following the step shown in FIG. 12B; FIG. 16A is a layout view of the TFT array panel in the step following the step shown in FIG. 15; FIG. 16B is a sectional view of the TFT array panel shown in FIG. 16A taken along the line XVIb-XVIb'; FIG. 17A is a layout view of a TFT array panel in the step following the step shown in FIGS. 16A and 16B; and FIG. 17B is a sectional view of the TFT array panel shown in FIG. 17A taken along the line XVIIb-XVIIb'.

Referring to FIGS. 12A and 12B, a conductive film preferably made of metal and having a thickness of about 1,000 Å-3,000 Å is sputtered on an insulating substrate 110 and photolithographically etched to form a plurality of gate lines 121 including a plurality of gate electrodes 124 and the storage electrode lines 131.

Referring to FIG. 13, a gate insulating layer 140, an intrinsic a-Si layer 150, and an extrinsic a-Si layer 160 are sequentially deposited by CVD such that the layers 140, 150, and 160 have a thickness of about 1,500-5,000 Å, about 500-2,000 Å, and about 300-600 Å, respectively. A conductive layer 170 having a thickness of about 1,500 Å-3,000 Å is deposited by sputtering, and a photoresist film with the thickness of about 1-2 microns is coated on the conductive layer 170.

Subsequently, a photoresist film is exposed to light through an exposure mask (not shown), and developed such that the developed photoresist has a position dependent thickness. The photoresist shown in FIG. 13 includes a plurality of first to third portions with decreased thickness. The first portions located on wire areas A are indicated by reference numeral 61, the second portions located on channel areas C are indicated by reference numeral 62, and no reference numeral is assigned to the third portions located on remaining areas B since they have substantially zero or very small thickness to expose underlying portions of the conductive layer 170. The thickness ratio of the second portions 62 to the first portions 61 is adjusted depending upon the process conditions in the subsequent process steps. It is preferable that the thickness of the second portions 62 is equal to or less than half of the thickness of the first portions 61, and in particular, equal to or less than 4,000 Å.

The position-dependent thickness of the photoresist is obtained by several techniques, for example, by providing translucent areas on the exposure mask as well as transparent areas and light blocking opaque areas. The translucent areas may have a slit pattern, a lattice pattern, a thin film(s) with intermediate transmittance or intermediate thickness. When using a slit pattern, it is preferable that the width of the slits or the distance between the slits is smaller than the resolution of a light exposer used for the photolithography. Another example is to use reflowable photoresist. In detail, once a photoresist pattern made of a reflowable material is formed by using a normal exposure mask only with transparent areas and opaque areas, it is subject to reflow process to flow onto areas without the photoresist, thereby forming thin portions.

The different thickness of the photoresist enables selective etching of the underlying layers when using suitable process conditions. Therefore, a plurality of data lines 171 including a plurality of source electrodes 173 and a plurality of drain electrodes 175, as well as a plurality of ohmic contact stripes 161 including a plurality of projections 163, a plurality of ohmic contact islands 165, and a plurality of semiconductor stripes 151 including a plurality of projections 154, are obtained by a series of etching steps.

For descriptive purposes, portions of the conductive layer 170, the extrinsic a-Si layer 160, and the intrinsic a-Si layer 150 on the wire areas A are called first portions, portions of the conductive layer 170, the extrinsic a-Si layer 160, and the intrinsic a-Si layer 150 on the channel areas C are called second portions, and portions of the conductive layer 170, the extrinsic a-Si layer 160, and the intrinsic a-Si layer 150 on the remaining areas B are called third portions.

An example of a sequence of forming such a structure is as follows:

(1) Removal of third portions of the conductive layer 170, the extrinsic a-Si layer 160 and the intrinsic a-Si layer 150 on the wire areas A;

(2) Removal of the second portions 62 of the photoresist;

(3) Removal of the second portions of the conductive layer 170 and the extrinsic a-Si layer 160 on the channel areas C; and (4) Removal of the first portions 61 of the photoresist.

Another example of a sequence is as follows:

(1) Removal of the third portions of the conductive layer 170;

(2) Removal of the second portions 62 of the photoresist;

(3) Removal of the third portions of the extrinsic a-Si layer 160 and the intrinsic a-Si layer 150;

(4) Removal of the second portions of the conductive layer 170;

(5) Removal of the first portions 61 of the photoresist; and (6) Removal of the second portions of the extrinsic a-Si layer 160.

The first example is described in detail.

Referring to FIG. 14, the exposed third portions of the conductive layer 170 on the remaining areas B are removed by a wet etch or dry etch to expose the underlying third portions of the extrinsic a-Si layer 160. An Al containing metal layer can be etched by known dry etching and/or wet etching methods, while a Cr layer is preferably wet etched with an etchant of CeNHO$_3$. The dry etch may remove the top portions of the photoresist. Reference numeral 172 indicates remaining portions of the conductive layer 170 after the etching.

Referring to FIG. 15, the third portions of the extrinsic a-Si layer 160 and of the intrinsic a-Si layer 150 on the areas B are removed preferably by dry etching and the second portions 62 of the photoresist are removed to expose the second portions of the conductors 172. The removal of the second portions 62 of the photoresist are performed either simultaneously with or independent from the removal of the third portions of the extrinsic a-Si layer 160 and of the intrinsic a-Si layer 150.

Residue of the second portions 62 of the photoresist remaining on the channel areas C is removed by ashing.

The semiconductor stripes 151 are completed in this step and reference numeral 164 indicates portions of the extrinsic a-Si layer 160 after etching, which are called "extrinsic semiconductor stripes."

Referring to FIGS. 16A and 16B, the second portions of the conductive layer 170 and the extrinsic a-Si layer 160 on the channel areas C as well as the first portions 61 of the photoresist are removed. The removal of the first portions 61 is performed after removing the second portions of the conductive layer 170 or after removing the second portions of the extrinsic a-Si layer 160.

Top portions of the projections 154 of the intrinsic semiconductor stripes 151 on the channel areas C may be removed to cause thickness reduction, and the first portions 61 of the photoresist are etched to a predetermined thickness.

In this way, the formation of the data lines 171, the drain electrodes 175, the ohmic contact stripes and islands 161 and 165 is completed.

Referring to FIGS. 17A and 17B, photosensitive films including red, green, and blue pigments are coated and patterned in sequence to form a plurality of red, green, and blue color filter stripes R, G, and B. At this time, a plurality of light blocking members (not shown) preferably made of the same layer as the red or the green color stripes R or G are formed on the channel portions of the TFTs in order to enhance the blocking of the light incident on the channel portions of the TFTs. A passivation layer 180 is deposited and patterned along with the color filter stripes R, G, and B, and the gate insulating layer 140 to form a plurality of contact holes 181, 182, and 185.

Finally, as shown in FIGS. 9-11, a plurality of pixel electrodes 190 and a plurality of contact assistants 81 and 82 are formed on the passivation layer 180 by depositing and photolithographically etching an ITO or IZO layer having a thickness of about 1,400 Å-1,600 Å. An alignment layer 11 is then coated on pixel electrodes 190.

This embodiment simplifies the manufacturing process by forming the data lines 171 and the drain electrodes 175 as well as the ohmic contacts 161 and 165 and the semiconductor stripes 151 using a single photolithography step.

An LCD according to another embodiment of the present invention will be described in detail with reference to FIGS. 18-20.

Figure 18:
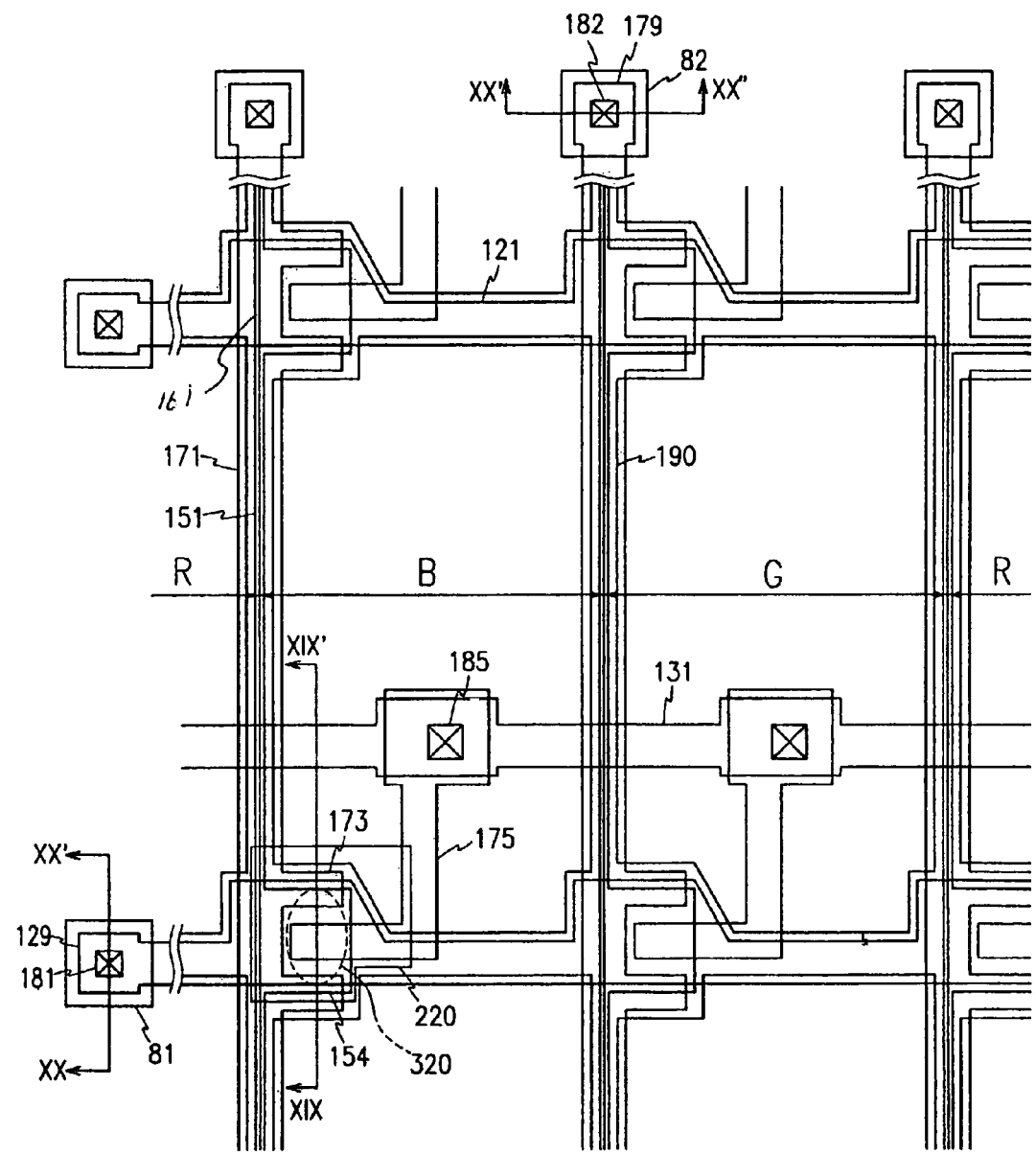
FIG. 18 is a layout view of an LCD according to another embodiment of the present invention.
Figure 19:
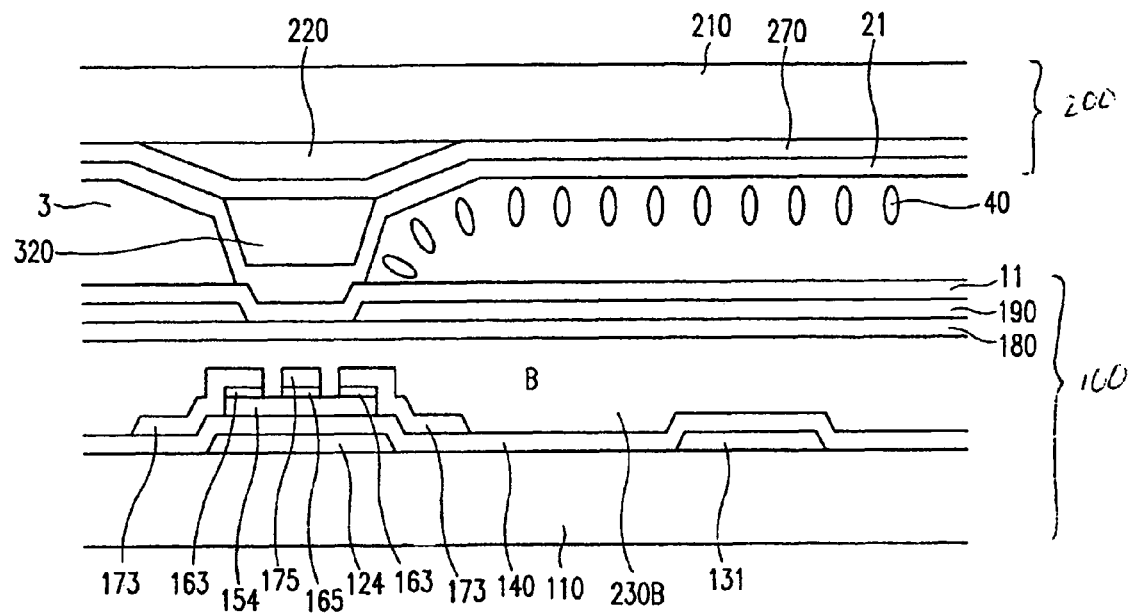
FIG. 19 is a sectional view of the LCD shown in FIG. 18 taken along the line XIX-XIX'.
Figure 20:
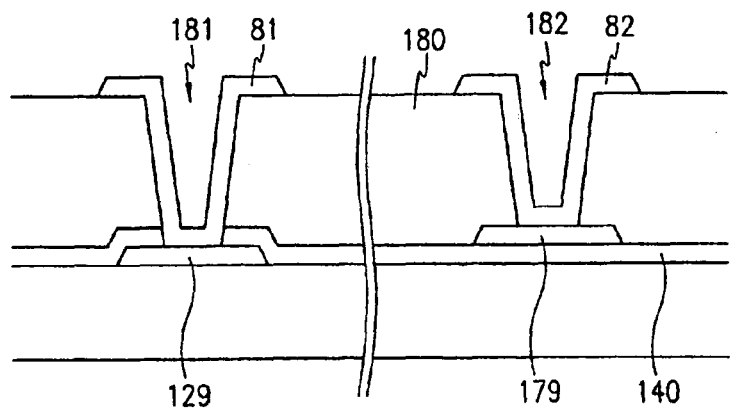
FIG. 20 is a sectional view of the LCD shown in FIG. 18 taken along the lines XX-XX' and XX'-XX"

FIG. 18 is a layout view of an LCD according to another embodiment of the present invention, and FIG. 19 is a sectional view of the LCD shown in FIG. 18 taken along the line XIX-XIX, and FIG. 20 is a sectional view of the LCD shown in FIG. 18 taken along the lines XX-XX' and XX'-XX".

Referring to FIGS. 18-20, an LCD according to this embodiment also includes a lower panel 100, an upper panel 200, and a LC layer 3 interposed therebetween and including a plurality of liquid crystal molecules 40.

Layered structures of the panels 100 and 200 according to this embodiment are similar to those shown in FIGS. 1-3.

Regarding the lower panel 100, a plurality of gate lines 121 including a plurality of gate electrodes 124 and the storage electrode lines 131 are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and a plurality of drain electrodes 175 are formed on the ohmic contacts 161 and 165 and the gate insulating layer 140, and a plurality of red, green, and blue color filter stripes R, G, and B and a passivation layer 180 is formed thereon. A plurality of contact holes 181, 182, and 185 are provided at the passivation layer 180, the color filter stripes R, G, and B, and the gate insulating layer 140, and a plurality of pixel electrodes 190 and a plurality of contact assistants 81 and 82 are formed on the passivation layer 180.

Regarding the upper panel 200, a plurality of light blocking members 220 facing TFTs on the blue color filter stripes B on the lower panel 100, a common electrode 270, and a plurality of columnar spacers 320 are formed on an insulating substrate 210.

Different from the LCD shown in FIGS. 1-3, the light blocking members 220 have edges that are not covered by opaque elements such as the storage electrode lines 131, the gate lines 121, and the data lines 171. Instead, the light blocking members 220 have smooth lateral surfaces in order to prevent the light leakage due to the height difference at the edges of the light blocking members 220. The angle of the lateral surfaces relative to a surface of the substrate 210 is preferably lower than 30 degrees.

A method of manufacturing the upper panel of the LCD shown in FIGS. 18-20 according to an embodiment of the present invention will be now described in detail with reference to FIGS. 21A-21C as well as FIGS. 18-20.

Figure 21A:
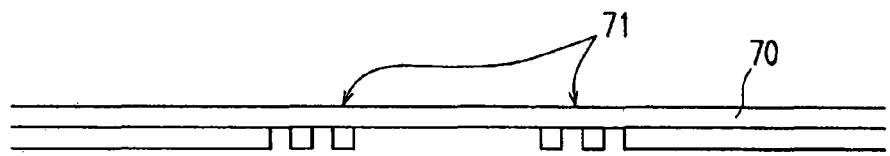
FIGS. 21A-21C are sectional views illustrating a manufacturing method of the lower panel shown in FIGS. 18-20 according to an embodiment of the present invention.
Figure 21B:
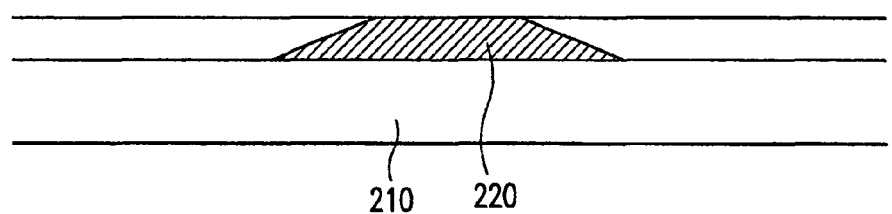
Figure 21C:
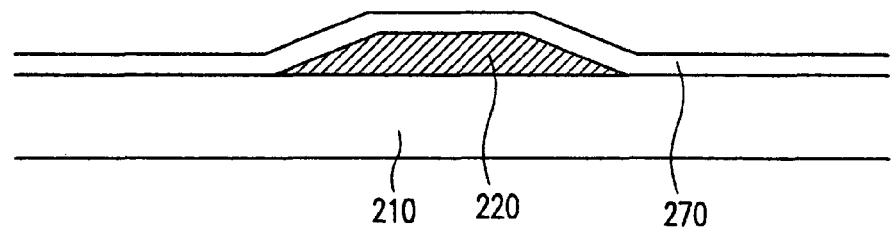

FIGS. 21A-21C are sectional views illustrating a manufacturing method of the lower panel shown in FIGS. 18-20 according to an embodiment of the present invention.

Referring to FIG. 21A, a negative type photosensitive organic film containing black pigment is coated on an insulating substrate 210 and exposed to light through a photomask 70 having light transmitting areas, light blocking areas, and slit areas 71 disposed around the light transmitting areas. If the photosensitive film is a positive type photoresist, the positions of the light transmitting areas and the light blocking areas are exchanged. Portions of the photosensitive film disposed opposite the light transmitting areas fully absorb the energy of the incident light, portions of the photosensitive film disposed opposite the slit areas 71 partly absorb the light energy, and portions of the photosensitive film disposed opposite the light blocking areas do not receive the light energy. Accordingly, a plurality of light blocking members 220 having smooth lateral surfaces are formed.

Referring to FIG. 21B, an ITO or IZO film is deposited to form a common electrode 270.

Referring to FIG. 21C, an acrylic photosensitive organic film is coated and patterned by photolithography to form a plurality of columnar spacers 320 disposed on the light blocking members 220. Thicknesses of the spacers 320 and the light blocking members 220 are preferably about 2.5 microns and about 1.5 microns, respectively, when a cell gap between the lower panel 100 and the upper panel 200 is about 4.0 microns.

Finally, as shown in FIGS. 18-20, an alignment layer 21 is coated on the substrate 210.

Many of the above-described features of the LCD shown in FIGS. 1-3 and the manufacturing method thereof shown in FIGS. 4A-8B may be appropriate to the LCD shown in FIGS. 18-20.

An LCD according to another embodiment of the present invention will be described in detail with reference to FIGS. 22-24.

Figure 22:
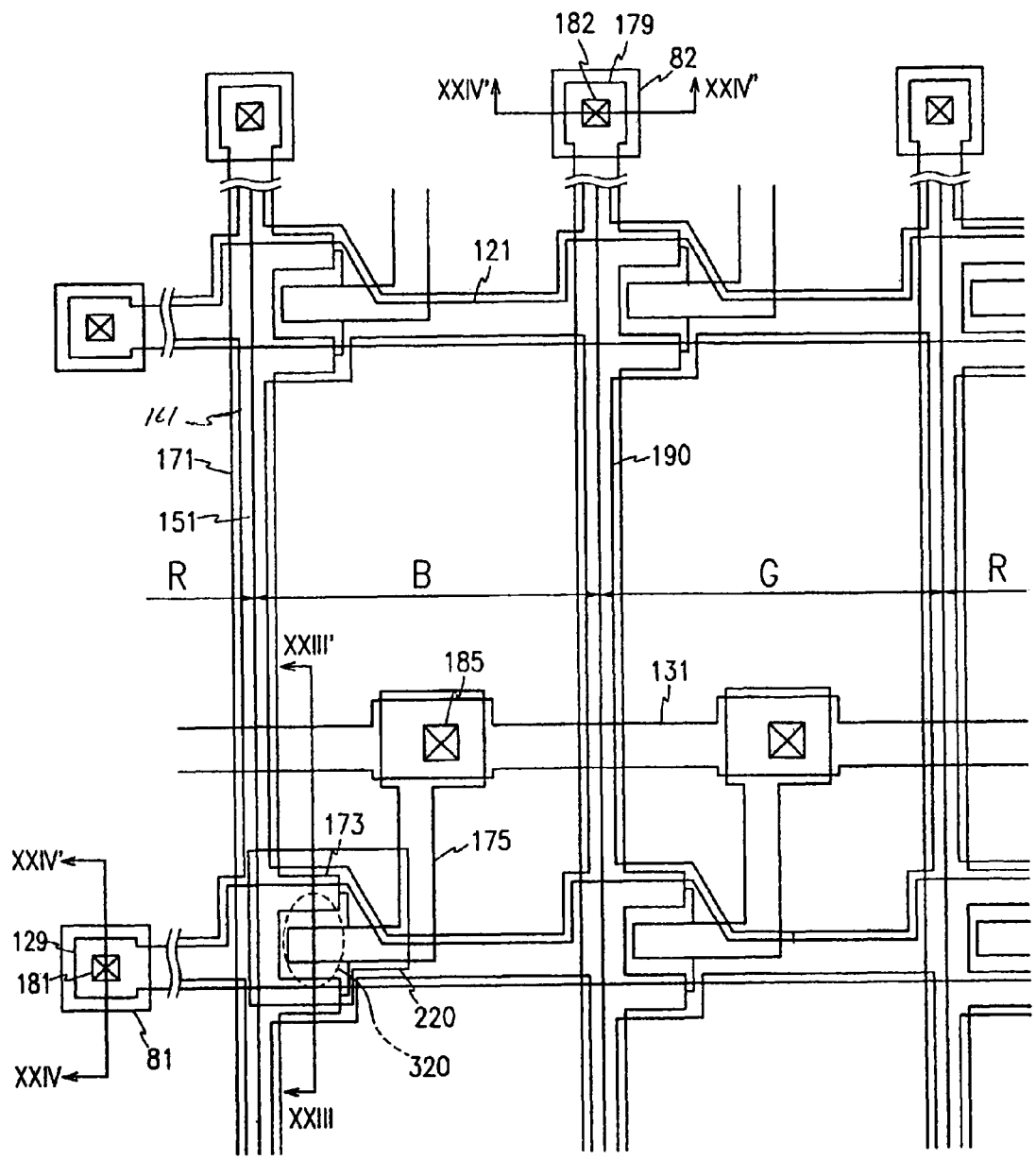
FIG. 22 is a layout view of an LCD according to another embodiment of the present invention.
Figure 23:
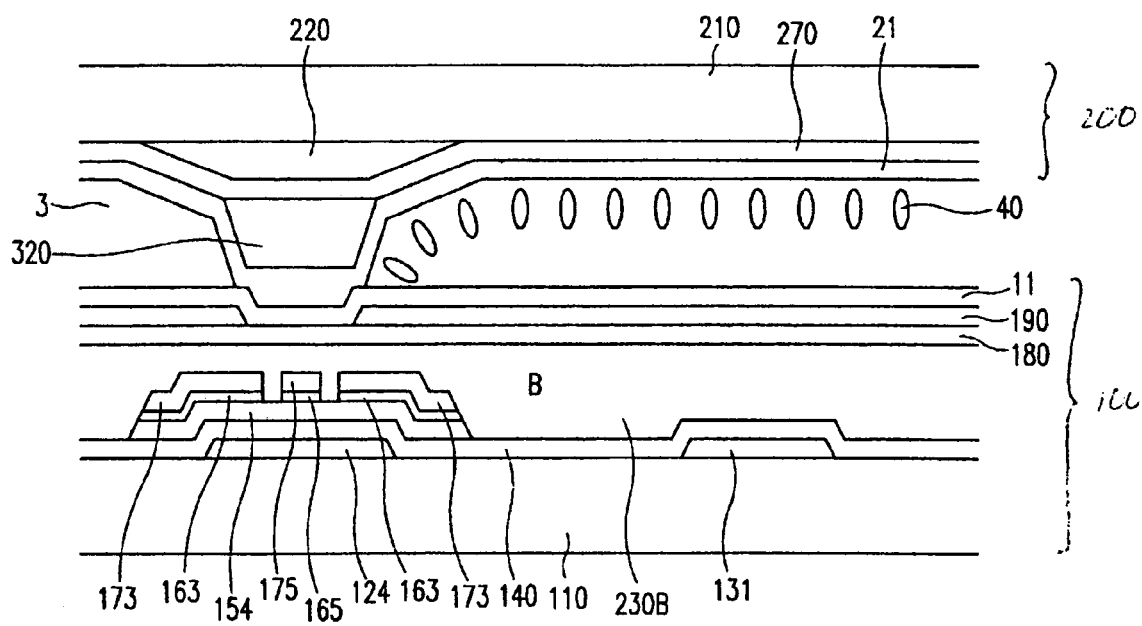
FIG. 23 is a sectional view of the LCD shown in FIG. 22 taken along the line XXIII-XXIII'.
Figure 24:
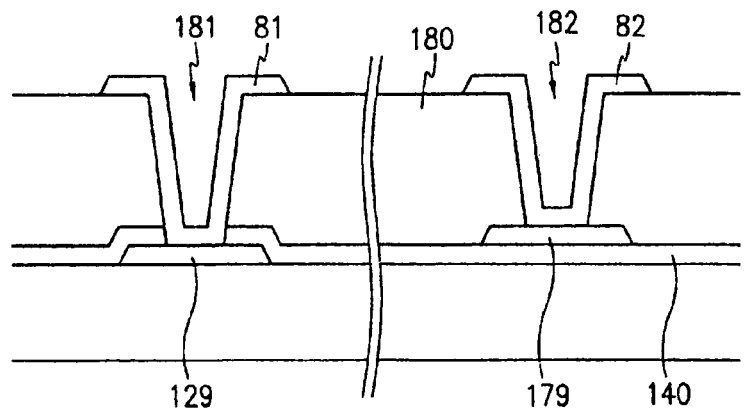
FIG. 24 is a sectional view of the LCD shown in FIG. 22 taken along the lines XXIV-XXIV' and XXIV'-XXIV"'.

FIG. 22 is a layout view of an LCD according to another embodiment of the present invention, FIG. 23 is a sectional view of the LCD shown in FIG. 22 taken along the line XXIII-XXIII', and FIG. 24 is a sectional view of the LCD shown in FIG. 22 taken along the lines XXIV-XXIV' and XXIV"-XXIV".

Referring to FIGS. 22-24, an LCD according to this embodiment also includes a lower panel 100, an upper panel 200, and a LC layer 3 interposed therebetween and including a plurality of liquid crystal molecules 40.

Layered structures of the panels 100 and 200 according to this embodiment are similar as those shown in FIGS. 18-20.

Regarding the lower panel 100, a plurality of gate lines 121 including a plurality of gate electrodes 124 and the storage electrode lines 131 are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and a plurality of drain electrodes 175 are formed on the ohmic contacts 161 and 165 and the gate insulating layer 140, and a plurality of red, green, and blue color filter stripes R, G, and B and a passivation layer 180 is formed thereon. A plurality of contact holes 181, 182, and 185 are provided at the passivation layer 180, the color filter stripes R, G, and B, and the gate insulating layer 140, and a plurality of pixel electrodes 190 and a plurality of contact assistants 81 and 82 are formed on the passivation layer 180.

Regarding the upper panel 200, a plurality of light blocking members 220 facing TFTs and having smooth lateral surfaces, a common electrode 270, and a plurality of columnar spacers 320 are formed on an insulating substrate 210.

Different from the LCD shown in FIGS. 18-20, the semiconductor; stripes 151 have almost the same planar shapes as the data lines 171 and the drain electrodes 175 as well as the underlying ohmic contacts 161 and 165, except for the projections 154 where TFTs are provided. That is, the semiconductor stripes 151 include some exposed portions, which are not covered with the data lines 171 and the drain electrodes 175, such as portions located between the source electrodes 173 and the drain electrodes 175.

Many of the above-described features of the LCD shown in FIGS. 18-20 may be appropriate to the LCD shown in FIGS. 22-24.

An LCD according to another embodiment of the present invention will be described in detail with reference to FIG. 25.

Figure 25:
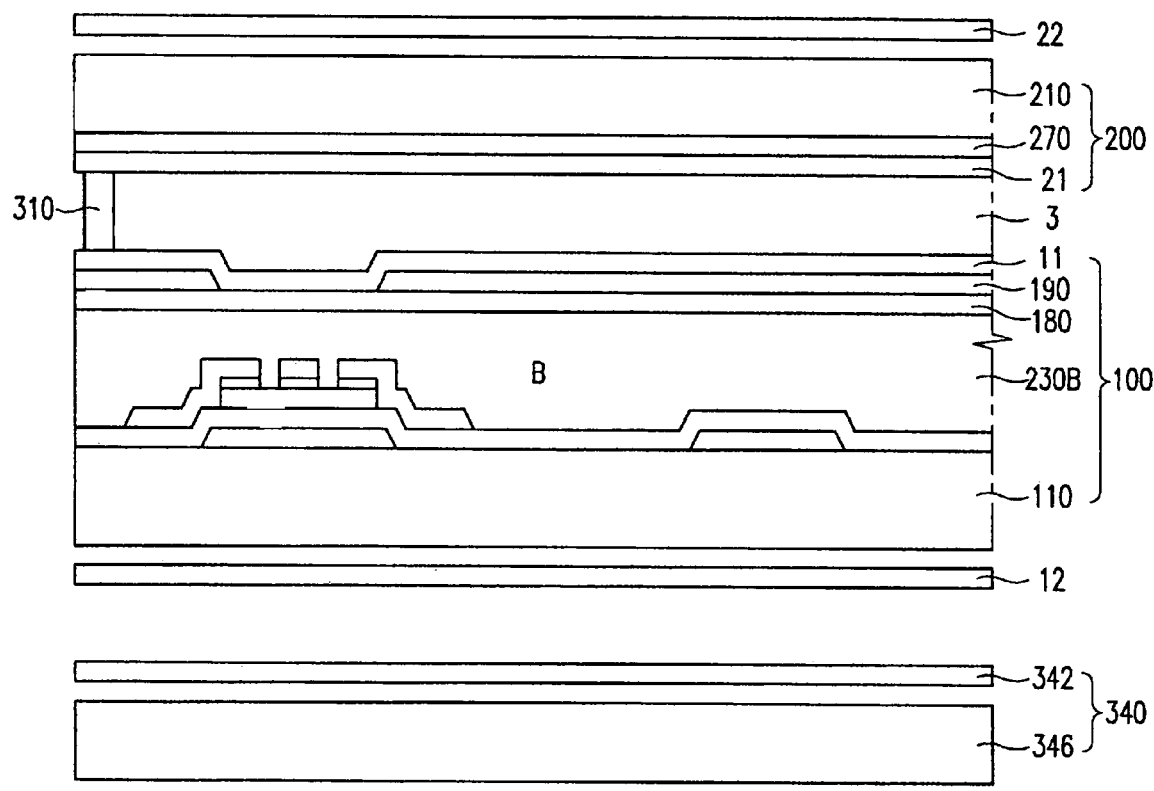
FIG. 25 is a sectional view of an LCD according to another embodiment of the present invention.

FIG. 25 is a sectional view of an LCD according to another embodiment of the present invention.

Referring to FIG. 25, an LCD according to this embodiment also includes a lower panel 100, an upper panel 200, and a LC layer 3 interposed therebetween and including a plurality of liquid crystal molecules 40.

Layered structures of the panels 100 and 200 according to this embodiment are almost the same as those shown in FIGS. 1-3 or FIGS. 18-20.

Regarding the lower panel 100, a plurality of gate lines 121 including a plurality of gate electrodes 124 and the storage electrode lines 131 are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and a plurality of drain electrodes 175 are formed on the ohmic contacts 161 and 165 and the gate insulating layer 140, and a plurality of red, green, and blue color filter stripes R, G, and B and a passivation layer 180 is formed thereon. A plurality of contact holes 181, 182, and 185 are provided at the passivation layer 180, the color filter stripes R, G, and B, and the gate insulating layer 140, and a plurality of pixel electrodes 190 and a plurality of contact assistants 81 and 82 are formed on the passivation layer 180.

Regarding the upper panel 200, a common electrode 270 is formed on an insulating substrate 210.

Furthermore, FIG. 25 shows a pair of polarizers 12 and 22 attached on outer surfaces of the panels 100 and 200, and a backlight unit 340 including a lamp 346 and a diffuser 342 disposed below the lower panel 100.

The polarizer 22 on the upper panel 200 that is located opposite the backlight unit 340 contains a material that can absorb ultraviolet rays. Otherwise, the polarizer 22 is covered with a coating that can absorb ultraviolet rays. These can prevent the ultraviolet ray, from reaching TFTs.

FIG. 25 still further illustrates a sealant 310 that seals a gap between the upper panel 200 and the lower panel 100 such that the gap is filled with the liquid crystal layer 3.

Instead, there is no light blocking member on the upper panel 200, which faces a TFT on the lower panel 100.

Many of the above-described features of the LCD shown in FIGS. 22-24 may be appropriate to the LCD shown in FIG. 25.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display having a plurality of pixels representing a different color, comprising:
    a first panel including:
        a first insulating substrate;
        a transistor formed on the first insulating substrate;
    a second panel including:
        a second insulating substrate;
        a light blocking member formed on the second insulating substrate overlapping the transistor, the light blocking member being disposed in a blue color pixel, light blocking members being absent in the other color pixels representing a different color from the blue color pixel; and
    a liquid crystal layer between the first panel and the second panel.

2. The liquid crystal display of claim 1, wherein the light blocking member overlaps a pixel electrode.

3. A display device panel having a plurality of pixels representing different primary colors, comprising:
    an insulating substrate; and
    a light blocking member having an inclined edge profile of less than about 30 degrees,
    wherein the light blocking member is disposed in a blue color pixel, light blocking members being absent in the other color pixels having a different color from the blue color pixel.

4. The panel of claim 3, wherein the insulating substrate comprises transparent glass.

5. The panel of claim 3, wherein the light blocking member comprises organic material containing black pigment.

6. The panel of claim 3, wherein the light blocking member has a thickness between about 1.5 microns and about 3.0 microns.

7. The panel of claim 3, wherein the light blocking member is disposed in a blue color pixel formed on the insulating substrate.

8. The panel of claim 3, further comprising:
an electrode formed on the light blocking member and the insulting substrate; and
a spacer formed on the electrode and overlapping the light blocking member.

9. The panel of claim 8, wherein the electrode comprises a transparent conductive material selected from the group consisting of indium tin oxide and indium zinc oxide.

10. The panel of claim 8, wherein a common voltage is applied to the electrode.

11. The panel of claim 8, further comprising an alignment layer on the spacer and the electrode.

12. The display device of claim 3, wherein the light blocking member overlaps a pixel electrode.

* * * * *